US012489533B2

(12) United States Patent
Jung et al.

(10) Patent No.: US 12,489,533 B2
(45) Date of Patent: Dec. 2, 2025

(54) METHOD AND APPARATUS FOR PERFORMING V2X COMMUNICATION IN A WIRELESS COMMUNICATION SYSTEM

(71) Applicant: Samsung Electronics Co., Ltd., Suwon-si (KR)

(72) Inventors: Sangyeob Jung, Suwon-si (KR); Anil Agiwal, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 17/773,688

(22) PCT Filed: Nov. 4, 2020

(86) PCT No.: PCT/KR2020/015334
§ 371 (c)(1),
(2) Date: May 2, 2022

(87) PCT Pub. No.: WO2021/091227
PCT Pub. Date: May 14, 2021

(65) Prior Publication Data
US 2022/0393780 A1    Dec. 8, 2022

(30) Foreign Application Priority Data

Nov. 7, 2019 (KR) .................. 10-2019-0142014

(51) Int. Cl.
*H04B 17/327* (2015.01)
*H04W 4/40* (2018.01)
(Continued)

(52) U.S. Cl.
CPC ............ *H04B 17/327* (2015.01); *H04W 4/40* (2018.02); *H04W 24/10* (2013.01); *H04W 52/10* (2013.01);
(Continued)

(58) Field of Classification Search
CPC ...... H04B 17/327; H04W 4/40; H04W 76/14; H04W 24/10; H04W 52/383
See application file for complete search history.

(56) References Cited

U.S. PATENT DOCUMENTS 10,278,207 B2 *  4/2019  Lee ..................... H04L 1/0025
11,109,363 B2 *  8/2021  Huang ................. H04L 1/1896
(Continued)

FOREIGN PATENT DOCUMENTS

| CA | 2971875 C | * | 9/2022 | ........... H04B 17/318 |
| CA | 2992689 C | * | 9/2023 | ........... H04B 17/318 |

(Continued)

OTHER PUBLICATIONS

Extended European Search Report dated Dec. 8, 2022, issued in a counterpart European Application No. 20883745.0.
(Continued)

*Primary Examiner* — Chi H Pham
*Assistant Examiner* — Vladislav Y Agureyev
(74) *Attorney, Agent, or Firm* — Jefferson IP Law, LLP

(57) ABSTRACT

Provided are a method and apparatus for performing vehicle-to-everything (V2X) communication in a wireless communication system, and an operation method of a first terminal in a wireless communication system includes: receiving, from a second terminal, a PC5 radio resource control (RRC) reconfiguration message including configuration information for measurement of sidelink reference signal received power (SL-RSRP); measuring the SL-RSRP, based on the configuration information for measuring the SL-RSRP; and when a reporting type regarding the measurement of the SL-RSRP is periodic reporting and a measurement value of a Layer 3 filtered SL-RSRP is present, transmitting the measurement value of the Layer 3 filtered SL-RSRP to the second terminal.

12 Claims, 12 Drawing Sheets

(51) Int. Cl.
*H04W 24/10* (2009.01)
*H04W 52/10* (2009.01)
*H04W 52/24* (2009.01)
*H04W 52/38* (2009.01)
*H04W 76/14* (2018.01)

(52) U.S. Cl.
CPC ....... *H04W 52/241* (2013.01); *H04W 52/383* (2013.01); *H04W 76/14* (2018.02)

(56) References Cited

U.S. PATENT DOCUMENTS

| | | | | |
|---|---|---|---|---|
| 11,553,503 | B2* | 1/2023 | Parron | H04W 4/46 |
| 12,095,566 | B2* | 9/2024 | Hwang | H04L 1/1812 |
| 2013/0210422 | A1* | 8/2013 | Pani | H04W 8/02 455/423 |
| 2016/0212721 | A1* | 7/2016 | Sheng | H04W 48/18 |
| 2017/0026861 | A1* | 1/2017 | Tseng | H04W 24/08 |
| 2017/0150490 | A1* | 5/2017 | Chen | H04W 76/14 |
| 2018/0220318 | A1* | 8/2018 | Uemura | H04B 17/318 |
| 2018/0227972 | A1 | 8/2018 | Tsuboi et al. | |
| 2018/0227973 | A1 | 8/2018 | Tsuboi et al. | |
| 2019/0075014 | A1* | 3/2019 | Zhou | H04W 24/02 |
| 2019/0394786 | A1* | 12/2019 | Parron | H04W 4/46 |
| 2020/0008183 | A1* | 1/2020 | Chen | H04W 72/20 |
| 2020/0067610 | A1 | 2/2020 | Lee et al. | |
| 2020/0145937 | A1* | 5/2020 | Heo | H04W 76/10 |
| 2020/0205062 | A1* | 6/2020 | Azizi | H04W 24/08 |
| 2020/0267523 | A1* | 8/2020 | Tang | H04L 5/0064 |
| 2020/0305174 | A1* | 9/2020 | Ganesan | H04W 4/029 |
| 2020/0351975 | A1* | 11/2020 | Tseng | H04L 5/0057 |
| 2020/0404736 | A1* | 12/2020 | Zhou | H04B 17/318 |
| 2021/0045093 | A1* | 2/2021 | Rao | H04W 72/04 |
| 2021/0051600 | A1* | 2/2021 | Fakoorian | H04W 52/242 |
| 2021/0058136 | A1* | 2/2021 | Yang | H04W 72/0453 |
| 2021/0084596 | A1* | 3/2021 | Lee | H04W 52/146 |
| 2021/0136731 | A1* | 5/2021 | Li | H04W 28/0278 |
| 2021/0136742 | A1* | 5/2021 | Huang | H04L 5/0057 |
| 2021/0136848 | A1* | 5/2021 | Park | H04W 76/14 |
| 2021/0136856 | A1* | 5/2021 | Tseng | H04W 76/14 |
| 2021/0136861 | A1* | 5/2021 | Park | H04W 76/19 |
| 2021/0136863 | A1* | 5/2021 | Park | H04W 76/27 |
| 2021/0211845 | A1* | 7/2021 | Lin | H04W 4/40 |
| 2021/0219268 | A1* | 7/2021 | Li | H04B 17/318 |
| 2021/0250878 | A1* | 8/2021 | Liu | H04W 52/10 |
| 2021/0314917 | A1* | 10/2021 | Lee | H04W 72/02 |
| 2021/0336688 | A1* | 10/2021 | Lee | H04W 4/40 |
| 2021/0367876 | A1* | 11/2021 | Ramachandra | H04W 24/10 |
| 2021/0409990 | A1* | 12/2021 | Wang | H04W 24/08 |
| 2021/0410084 | A1* | 12/2021 | Li | H04W 52/265 |
| 2022/0014953 | A1* | 1/2022 | Teyeb | H04W 24/10 |
| 2022/0038929 | A1* | 2/2022 | Tsuboi | H04W 76/15 |
| 2022/0053439 | A1* | 2/2022 | Hu | H04W 56/004 |
| 2022/0150730 | A1* | 5/2022 | Freda | H04L 1/1812 |
| 2022/0201654 | A1* | 6/2022 | Lee | H04L 5/0053 |
| 2022/0217738 | A1* | 7/2022 | Lee | H04W 72/54 |
| 2022/0225295 | A1* | 7/2022 | Sartori | H04W 76/14 |
| 2022/0232523 | A1* | 7/2022 | Lee | H04L 47/125 |
| 2022/0256386 | A1* | 8/2022 | Kimba Dit Adamou | H04L 5/00 |
| 2022/0322325 | A1* | 10/2022 | Svedman | H04L 5/0051 |
| 2022/0345990 | A1* | 10/2022 | Godin | H04W 48/02 |
| 2022/0346038 | A1* | 10/2022 | Miao | H04W 52/245 |
| 2024/0340959 | A1* | 10/2024 | Deng | H04W 74/002 |

FOREIGN PATENT DOCUMENTS

| | | | | |
|---|---|---|---|---|
| CA | 3008125 C | * | 11/2023 | ........... H04B 17/318 |
| CN | 103298023 A | * | 9/2013 | |
| CN | 105766034 A | * | 7/2016 | ........... H04W 52/365 |
| CN | 108809897 A | | 11/2018 | |
| CN | 110383721 A | | 10/2019 | |
| CN | 110447294 A | * | 11/2019 | ........... H04L 27/0006 |
| CN | 110463234 A | * | 11/2019 | ............... H04W 4/40 |
| CN | 110602776 A | * | 12/2019 | ........... H04B 17/327 |
| CN | 111726856 A | * | 9/2020 | ........... H04W 52/146 |
| CN | 112788647 A | * | 5/2021 | ........... H04B 17/318 |
| CN | 114731314 A | * | 7/2022 | ........... H04W 52/242 |
| EP | 3128791 A1 | * | 2/2017 | ........... H04W 52/34 |
| EP | 3618391 A1 | | 3/2020 | |
| EP | 3780823 A1 | * | 2/2021 | ........... H04L 5/0048 |
| EP | 3 944 543 A1 | | 1/2022 | |
| EP | 3622758 B1 | * | 11/2023 | ........... H04W 24/10 |
| JP | 2017-038117 A | | 2/2017 | |
| JP | 2018026819 A | * | 2/2018 | ........... H04B 7/0632 |
| KR | 10-2020-0127515 A | | 11/2020 | |
| WO | WO-2017136666 A1 | * | 8/2017 | ........... H04B 17/318 |
| WO | 2018/005531 A1 | | 1/2018 | |
| WO | WO-2019165224 A1 | * | 8/2019 | ........... H04B 7/0626 |
| WO | 2019/190180 A1 | | 10/2019 | |
| WO | WO-2021003623 A1 | * | 1/2021 | ............... H04W 4/40 |
| WO | WO-2021073727 A1 | * | 4/2021 | |

OTHER PUBLICATIONS

Spreadtrum Communications; Discussion on physical layer procedures for sideiink; 3GPP TSG RAN WG1 #97; R1-1906362; May 2, 2019, Reno, USA.
ZTE Corporation, Sanechips; Consideration on sidelink RRM measurement; 3GPP TSG RAN WG2 Meeting #106; R2-1906479; May 13, 2019, Reno, USA.
Samsung; On Physical Layer Procedures for NR V2X; 3GPP TSG RAN WG1 #98bis; R1-1910475; Oct. 8, 2019, Chongqing, China.
International Search Report dated Feb. 9, 2021, issued in an International Application No. PCT /KR2020/015334.
LTE; Evolved Universal Terrestrial Radio Access (E-UTRA); Radio Resource Control (RRC); Protocol specification (3GPP TS 36.331 version 15.7.0 Release 15); ETSI TS 136 331 V15.7.0; Sep. 27, 2019.
Ericsson; PHY layer procedures for NR sidelink; 3GPP TSG-RAN WG1 Meeting #98bis; R1-1910538; Oct. 7, 2019, Chongqing, China.
Intel Corporation; Resource allocation mode-1 for Nr V2X sidelink communication; 3GPP TSG RAN WG1 Meeting #98bis; R1-1910649; Oct. 8, 2019, Chongqing, China.
VIVO; Remaining issues on PC5-RRC message exchange; 3GPP TSG-RAN WG2 Meeting #107bis; R2-1912261; Oct. 3, 2019, Chongqing, China.
Korean Office Action dated Mar. 13, 2024, issued in a counterpart Korean Application No. 10-2019-0142014.
Chinese Office Action dated Apr. 16, 2024, issued in a counterpart Chinese Application No. 202080090286.0.
Chinese Office Action dated Sep. 9, 2024, issued in Chinese Application No. 202080090286.0.
European Office Action dated Nov. 7, 2024, issued in European Application No. 20883745.0.
Chinese Office Action dated Jan. 17, 2025, issued in Chinese Application No. 2020080090286.0.

* cited by examiner

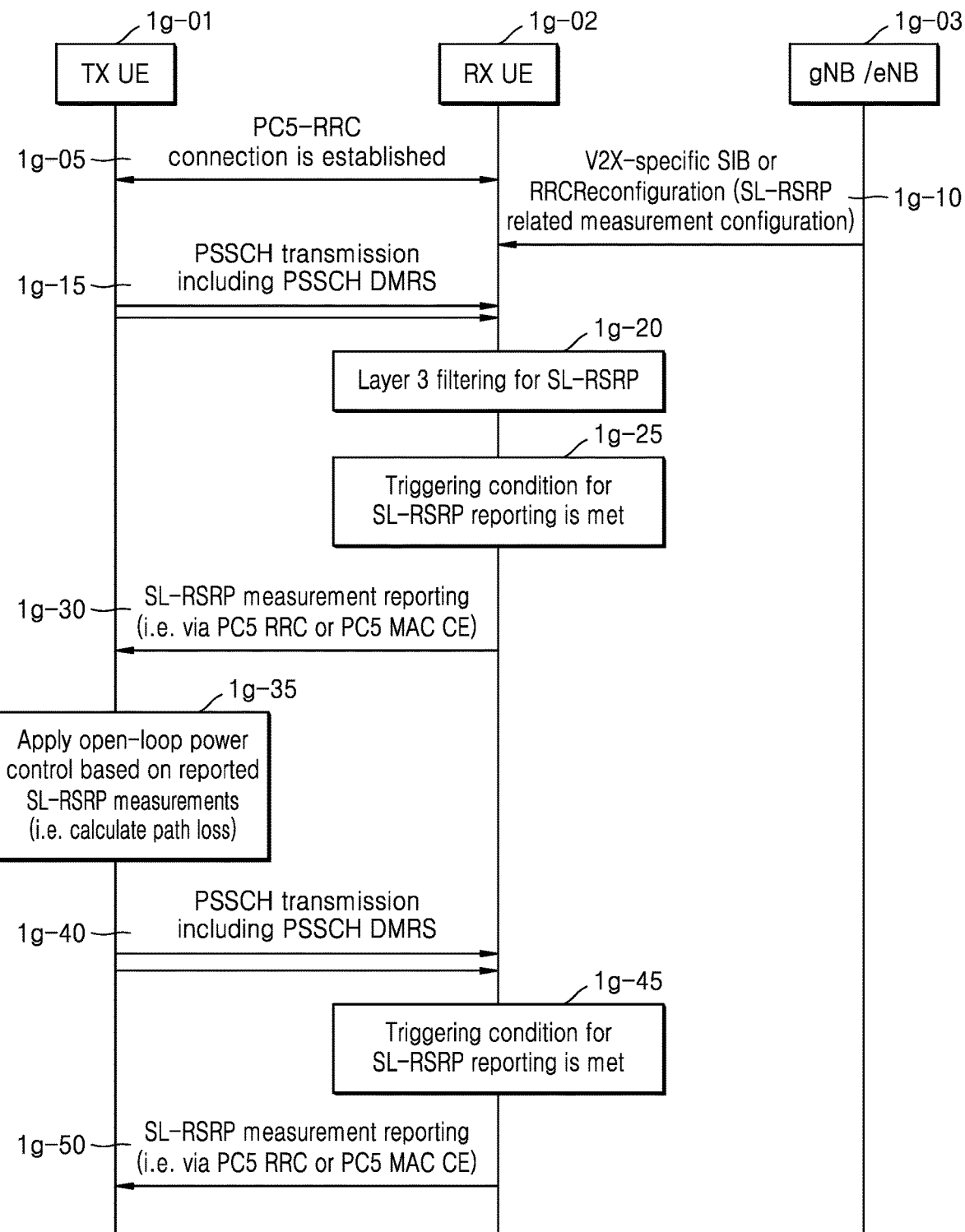

METHOD AND APPARATUS FOR PERFORMING V2X COMMUNICATION IN A WIRELESS COMMUNICATION SYSTEM

TECHNICAL FIELD

The disclosure relates to a method and apparatus for performing vehicle-to-everything (V2X) communication in a wireless communication system.

BACKGROUND ART

To meet the increase in demand for wireless data traffic after the commercialization of 4th generation (4G) communication systems, considerable efforts have been made to develop improved 5th generation (5G) communication systems or pre-5G communication systems. This is one reason why 5G communication systems or pre-5G communication systems are called beyond 4G network communication systems or post long-term evolution (LTE) systems. In order to achieve a high data rate, 5G communication systems are being developed to be implemented in a super-high frequency band (millimeter wave (mmWave)), e.g., a band of 60 GHz. In order to reduce a path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA) and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In an IoT environment, intelligent Internet technology (IT) services may be provided to collect and analyze data obtained from objects connected to each other to create new value in human life. As existing IT techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of a cloud radio access network (RAN) as a big data processing technology as described above may be an example of convergence of 5G communication technology and IoT technology.

As described above, various services may be provided due to the development of wireless communication systems, and thus there is need for methods of seamlessly providing such services.

DESCRIPTION OF EMBODIMENTS

Solution to Problem

Based on the discussion as described above, the disclosure provides an apparatus and method for effectively providing a service in a wireless communication system.

Advantageous Effects of Disclosure

Embodiments provide an apparatus and method for effectively providing a service in a wireless communication system.

BRIEF DESCRIPTION OF DRAWINGS

FIG. 1G is a diagram for describing a method by which a reception user equipment (UE) transmits Layer 3 (L3) filtered sidelink reference signal received power (SL-RSRP) to a transmission UE, during sidelink unicast communication, according to an embodiment of the disclosure.

BEST MODE

Figure 1A:
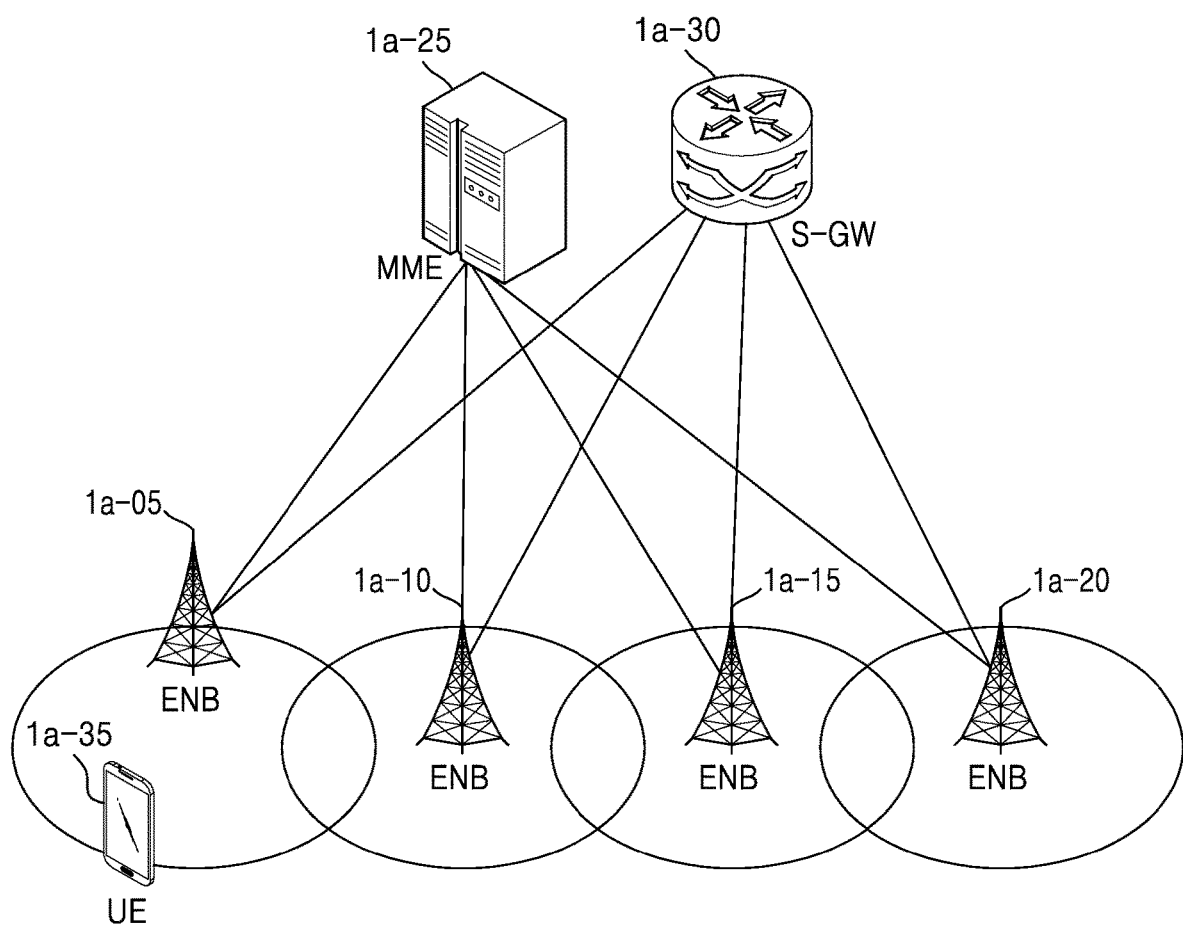
FIG. 1A is a diagram of a structure of a long-term evolution (LTE) system, according to an embodiment of the disclosure.

According to an embodiment of the disclosure, an operation method of a terminal in a wireless communication system includes: establishing a PC5-radio resource control (RRC) connection with another terminal; receiving, from a base station, system information including vehicle-to-everything (V2X) sidelink configuration information; transmitting, to the other terminal, a message including a configuration value related to sidelink reference signal received power (SL-RSRP) measurement; transmitting, to the other terminal, a physical sidelink shared channel (PSSCH); receiving, from the other terminal, reporting related to the SL-RSRP measurement; and performing open loop power control, based on the reporting.

According to an embodiment of the disclosure, an operation method of a first terminal in a wireless communication system includes: receiving, from a second terminal, a PC5 radio resource control (RRC) reconfiguration message including configuration information for measurement of sidelink reference signal received power (SL-RSRP); measuring the SL-RSRP, based on the configuration information for measuring the SL-RSRP; and when a reporting type regarding the measurement of the SL-RSRP is periodic reporting and a measurement value of a Layer 3 filtered SL-RSRP is present, transmitting the measurement value of the Layer 3 filtered SL-RSRP to the second terminal.

According to an embodiment of the disclosure, an operation method of a second terminal in a wireless communication system includes: receiving, from a base station, a radio resource control (RRC) reconfiguration message including configuration information for measurement of sidelink reference signal received power (SL-RSRP); transmitting, to a first terminal, a PC5 RRC reconfiguration message including the configuration information for the measurement of the SL-RSRP, based on the RRC reconfiguration message received from the base station, wherein the SL-RSRP is measured by the first terminal based on the configuration information for the measurement of the SL-RSRP; and receiving a measurement value of a Layer 3 filtered SL-RSRP from the first terminal, wherein the measurement value of the Layer 3 filtered SL-RSRP is received from the first terminal when a reporting type regarding the measurement of the SL-RSRP is periodic reporting and the measurement value of the Layer 3 filtered SL-RSRP is present.

According to an embodiment of the disclosure, a first terminal in a wireless communication system includes: a transceiver; and at least one processor configured to: receive, from a second terminal through the transceiver, a PC5 radio resource control (RRC) reconfiguration message including configuration information for measurement of sidelink reference signal received power (SL-RSRP); measure the SL-RSRP, based on the configuration information for measuring the SL-RSRP; and when a reporting type regarding the measurement of the SL-RSRP is periodic reporting and a measurement value of a Layer 3 filtered SL-RSRP is present, transmit the measurement value of the Layer 3 filtered SL-RSRP to the second terminal through the transceiver.

According to an embodiment of the disclosure, a second terminal in a wireless communication system includes: a transceiver; and at least one processor configured to: receive, from a base station through the transceiver, a radio resource control (RRC) reconfiguration message including configuration information for measurement of sidelink reference signal received power (SL-RSRP); transmit, to a first terminal through the transceiver, a PC5 RRC reconfiguration message including the configuration information for the measurement of the SL-RSRP, based on the RRC reconfiguration message received from the base station, wherein the SL-RSRP is measured by the first terminal based on the configuration information for the measurement of the SL-RSRP; and receive, from the first terminal through the transceiver, a measurement value of a Layer 3 filtered SL-RSRP, wherein the measurement value of the Layer 3 filtered SL-RSRP is received from the first terminal when a reporting type regarding the measurement of the SL-RSRP is periodic reporting and the measurement value of the Layer 3 filtered SL-RSRP is present.

MODE OF DISCLOSURE

Hereinafter, embodiments of the disclosure will be described with reference to accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

Advantages and features of the disclosure and methods of accomplishing the same may be understood more readily by reference to the following detailed description of the embodiments and the accompanying drawings. In this regard, the embodiments of the disclosure may have different forms and should not be construed as being limited to the descriptions set forth herein. Rather, these embodiments are provided so that the disclosure will be thorough and complete and will fully convey the concept of the disclosure to one of ordinary skill in the art, and the disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments of the disclosure, the "unit" may include at least one processor.

While describing the disclosure, detailed description of related well-known functions or configurations may be omitted when it is deemed that they may unnecessarily obscure the essence of the disclosure. Hereinafter, embodiments of the disclosure will be described with reference to accompanying drawings.

Also, terms for identifying access nodes, terms denoting network entities, terms denoting messages, terms denoting interfaces between network entities, terms denoting various types of identification information, etc. used herein are exemplified for convenience of description. Thus, the terms used in the disclosure are not limited and other terms denoting targets having the same technical meanings may be used.

Hereinafter, for convenience of description, the disclosure uses terms and names defined by the $3^{rd}$ generation partnership project long term evolution (3GPP LTE) standard. However, the disclosure is not limited by such terms and names, and may be equally applied to systems conforming to other standards. In particular, the disclosure may be applied to the 3GPP new radio (NR), i.e., the $5^{th}$ generation (5G) mobile communication standard. In the disclosure, an evolved node B (eNB) will be used interchangeably with a next generation node B (gNB) for convenience of description. In other words, a base station described as an eNB may also indicate a gNB. Also, the term "terminal" may indicate not only mobile phones, narrow band-Internet of things (NB-IoT) devices, and sensors, but also other wireless communication devices.

Hereinafter, a base station is an entity that allocates resources to a terminal, and may be at least one of a gNode B (gNB), an eNode B (eNB), a Node B (NB), a wireless access unit, a BS controller, or a node on a network. Examples of a terminal may include user equipment (UE), a mobile station (MS), a cellular phone, a smartphone, a computer, and a multimedia system capable of performing a communication function. The disclosure is not limited to the above examples.

The disclosure provides a method and apparatus by which a reception terminal performs Layer 3 (L3) filtering, and transmits a measurement result of performing the L3 filtering to a transmission terminal, when unicast vehicle communication is performed in a next-generation mobile communication system.

FIG. 1A is a diagram of a structure of a long-term evolution (LTE) system, according to an embodiment of the disclosure.

Referring to FIG. 1A, a radio access network of an LTE system may include evolved node Bs (eNBs) 1a-05, 1a-10, 1a-15, and 1a-20 (node Bs (NBs) or base stations), a mobility management entity (MME) 1a-25, and a serving-gateway (S-GW) 1a-30. A UE 1a-35 (or a terminal) may access an external network via the eNB 1a-05, 1a-10, 1a-15, or 1a-20 and the S-GW 1a-30.

In FIG. 1A, the eNBs 1a-05 through 1a-20 may correspond to existing NBs of a universal mobile telecommunication system (UMTS). The eNB 1a-05, 1a-10, 1a-15, or 1a-20 may be connected to the UE 1a-35 through a radio channel and may perform complex functions compared to the existing NB. In the LTE system, all user traffic including a real-time service such as voice over internet protocol (VoIP) may be provided via a shared channel. Accordingly, an entity that schedules the UEs 1a-35 by gathering state information such as buffer states, available transmit power states, and channel states of the UEs 1a-35 is required, and the eNB 1a-05, 1a-10, 1a-15, or 1a-20 may operate as the entity.

A single eNB may generally control multiple cells. For example, the LTE system may use radio access technology such as orthogonal frequency division multiplexing (OFDM) at a bandwidth of 20 MHz to achieve a data rate of 100 Mbps. Also, an adaptive modulation and coding (AMC) scheme may be used to determine a modulation scheme and a channel coding rate in accordance with the channel state of the UE 1a-35. The S-GW 1a-30 is an entity for providing data bearers and may configure or release the data bearers under the control of the MME 1a-25. The MME 1a-25 is an entity for performing a mobility management function and various control functions for the UE 1a-35 and may be connected to the eNBs 1a-05, a1-10, 1a-15, and 1a-20.

Figure 1B:
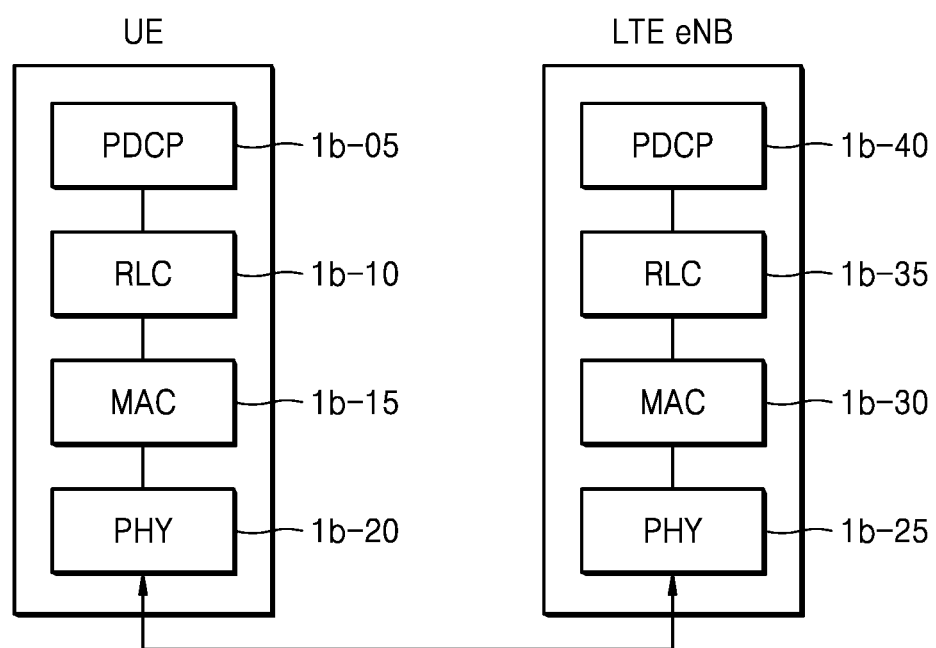
FIG. 1B is a diagram of a radio protocol architecture in an LTE system, according to an embodiment of the disclosure.

FIG. 1B is a diagram of a radio protocol architecture in an LTE system, according to an embodiment of the disclosure.

Referring to FIG. 1B, a radio protocol of the LTE system may include packet data convergence protocol (PDCP) layers 1b-05 and 1b-40, radio link control (RLC) layers 1b-10 and 1b-35, and media access control (MAC) layers 1b-15 and 1b-30 respectively for a UE and an eNB. The PDCP layer 1b-05 or 1b-40 may perform operations such as internet protocol (IP) header compression/restoration. Main functions of the PDCP layer 1b-05 or 1b-40 may be summarized as below.

Header compression and decompression: Robust header compression (ROHC) only
Transfer of user data
In-sequence delivery of upper layer packet data units (PDUs) at PDCP re-establishment procedure for RLC acknowledged mode (AM)
For split bearers in dual connectivity (DC) (only support for RLC AM): PDCP PDU routing for transmission and PDCP PDU reordering for reception)
Duplicate detection of lower layer service data units (SDUs) at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The RLC layer 1b-10 or 1b-35 may perform, for example, an automatic request for repetition (ARQ) operation by reconfiguring PDCP PDUs to appropriate sizes. Main functions of the RLC layer 1b-10 or 1b-35 may be summarized as below.
Transfer of upper layer PDUs
Error Correction through ARQ (only for AM data transfer)
Concatenation, segmentation, and reassembly of RLC SDUs (only for unacknowledged mode (UM) and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layer 1b-15 or 1b-30 is connected to multiple RLC layers configured for a single UE and may multiplex RLC PDUs into a MAC PDU and demultiplex the RLC PDUs from the MAC PDU. Main functions of the MAC layer 1b-15 or 1b-30 may be summarized as below.
Mapping between logical channels and transport channels
Multiplexing/demultiplexing of MAC SDUs belonging to one or different logical channels into/from transport blocks (TBs) delivered to/from the physical layer on transport channels
Scheduling information reporting
Error correction through HARQ
Priority handling between logical channels of one UE
Priority handling between UEs by means of dynamic scheduling
Multimedia broadcast and multicast service (MBMS) identification
Transport format selection
Padding A physical layer 1b-20 or 1b-25 may channel-code and modulate higher layer data into OFDM symbols and transmit the OFDM symbols through a radio channel, or demodulate OFDM symbols received through a radio channel and channel-decode and deliver the OFDM symbols to a higher layer.

Figure 1C:
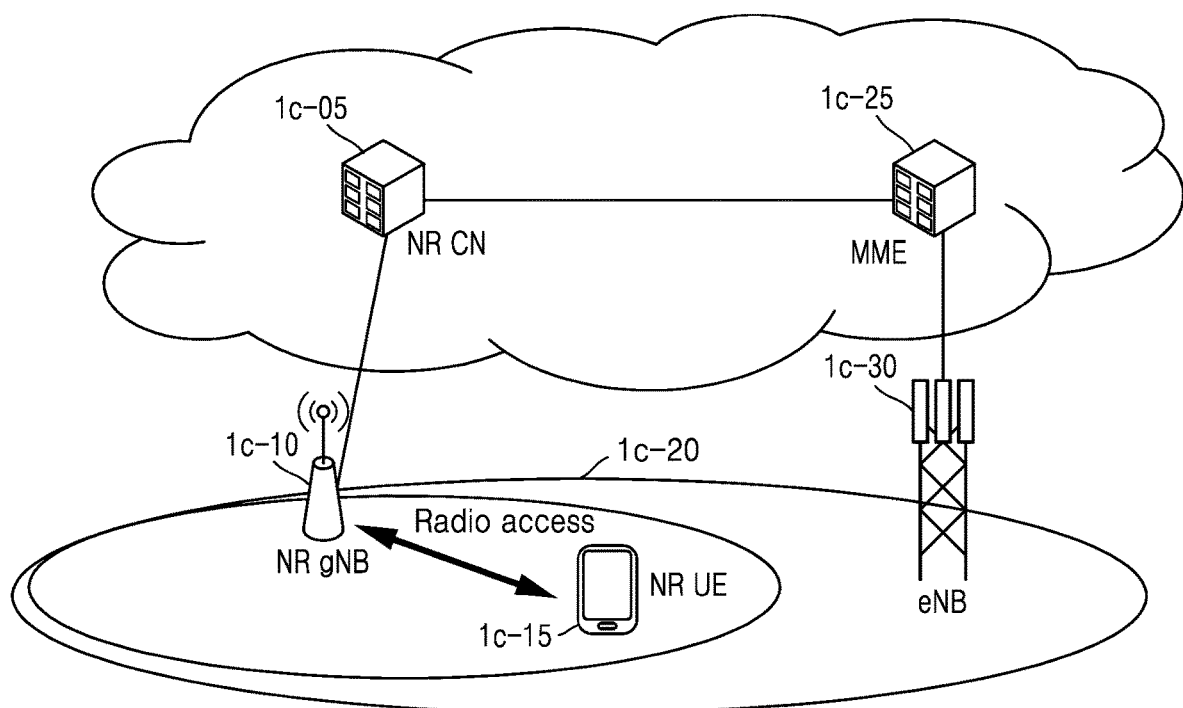
FIG. 1C is a diagram of a structure of a next-generation mobile communication system, according to an embodiment of the disclosure.

FIG. 1C is a diagram of a structure of a next-generation mobile communication system, according to an embodiment of the disclosure.

Referring to FIG. 1C, a radio access network of a next-generation mobile communication system (hereinafter, NR or 5G) may include an NR gNB 1c-10 (or NR base station) and an NR core network (CN) 1c-05. An NR UE 1c-15 (or a terminal) may access an external network via the NR gNB 1c-10 and the NR CN 1c-05. Also, the NR UE 1c-15 and the NR gNB 1c-10 may be included in an area 1c-20.

In FIG. 1C, the NR gNB 1c-10 may correspond to an eNB of an existing LTE system. The NR gNB 1c-10 is connected to the NR UE 1c-15 through a radio channel and may provide a superior service compared to an existing NB. In the next-generation mobile communication system, all user traffic may be provided via a shared channel. Accordingly, an entity that schedules UEs by gathering state information such as buffer states, available transmit power states, and channel states of the UEs is required, and the NR gNB 1c-10 may operate as the entity. One NR gNB 1c-10 may generally control a plurality of cells. In the next-generation mobile communication system, a bandwidth equal to or greater than a current maximum bandwidth may be applied to implement an ultra-high data rate compared to a current LTE system. Also, a beamforming technique may be grafted by using OFDM as a radio access technique. Also, an AMC scheme may be used to determine a modulation scheme and a channel coding rate in accordance with a channel state of the UE (NR UE 1c-15).

The NR CN 1c-05 may perform functions such as mobility support, bearer configuration, and quality of service (QoS) configuration. The NR CN 1c-05 is an entity for performing a mobility management function and various control functions for the UE (NR UE 1c-15) and may be connected to a plurality of base stations. Also, the next-generation mobile communication system may cooperate with the existing LTE system, and the NR CN 1c-05 may be connected to an MME 1c-25 through a network interface. The MME 1c-25 may be connected to an eNB 1c-30 that is an existing base station.

Figure 1D:
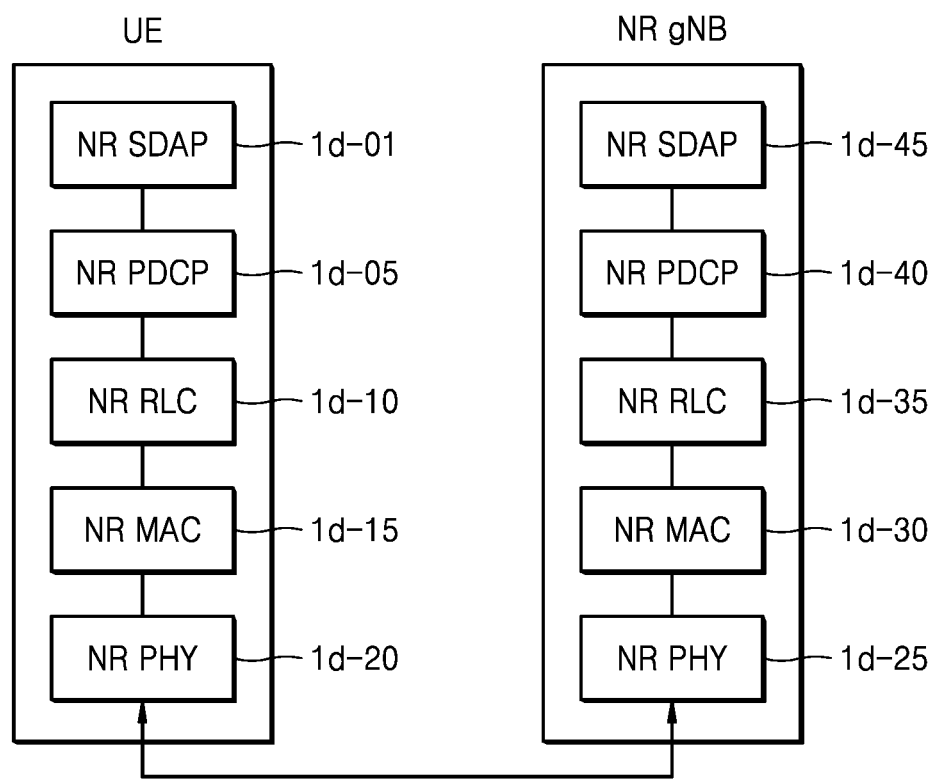
FIG. 1D is a diagram of a radio protocol architecture of a next-generation mobile communication system, according to an embodiment of the disclosure.

FIG. 1D is a diagram of a radio protocol architecture of a next-generation mobile communication system, according to an embodiment of the disclosure.

Referring to FIG. 1D, a radio protocol of the next-generation mobile communication system may include NR service data adaptation protocol (SDAP) layers 1d-01 and 1d-45, NR PDCP layers 1d-05 and 1d-40, NR RLC layers 1d-10 and 1d-35, NR MAC layers 1d-15 and 1d-30, and NR physical (PHY) layers 1d-20 and 1d-25 respectively for a UE and an NR gNB.

Main functions of the NR SDAP layers 1d-01 and 1d-45 may include some of the following functions.
Transfer of user plane data
Mapping between QoS flow and a data radio bearer (DRB) for both downlink (DL) and uplink (UL)
Marking QoS flow ID in both DL and UL packets
Reflective QoS flow to DRB mapping for the UL SDAP PDUs With respect to the NR SDAP layer 1d-01 or 1d-45, the UE may receive, via an RRC message, configurations on whether to use a header of the NR SDAP layer 1d-01 or 1d-45 or use a function of the NR SDAP layer 1d-01 or 1d-45 for each NR PDCP layer 1d-05 or 1d-40, each bearer, or each logical channel. When a SDAP header is configured, the UE may instruct mapping information on QoS flow of UL and DL, and a data bearer to be updated and reconfigured via non-access stratum (NAS) reflective QoS configuration 1-bit indicator and an access stratum (AS) reflective QoS configuration 1-bit indicator of the SDAP header. The SDAP header may include QoS flow ID indicating QoS. QoS information may be used as data processing priority information, scheduling information, etc. for supporting a smooth service.

Main functions of the NR PDCP layer 1*d*-05 or 1*d*-40 may include some of the following functions.

Header compression and decompression: Robust header compression (ROHC) only
    Transfer of user data
    In-sequence delivery of upper layer PDUs
    Out-of-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink A reordering function of the NR PDCP layer 1*d*-05 or 1*d*-40 may include denote a function of reordering PDCP PDUs received from a lower layer, based on a PDCP sequence number (SN). The reordering function of the NR PDCP layer 1*d*-05 or 1*d*-40 may include a function of delivering the reordered data to a higher layer in order or a function of immediately delivering the reordered data without considering an order, may include a function of recording missing PDCP PDUs by reordering the PDCP PDUs, may include a function of reporting state information of the missing PDCP PDUs to a transmitter, and may include a function of requesting to retransmit the missing PDCP PDUs.

The main functions of the NR RLC layer 1*d*-10 or 1*d*-35 may include at least some of the following functions.

Transfer of upper layer PDUs
    In-sequence delivery of upper layer PDUs
    Out-of-sequence delivery of upper layer PDUs
    Error correction through ARQ
    Concatenation, segmentation and reassembly of RLC SDUs
    Re-segmentation of RLC data PDUs
    Reordering of RLC data PDUs
    Duplicate detection
    Protocol error detection
    RLC SDU discard
    RLC re-establishment The in-sequence delivery function of the NR RLC layer 1*d*-10 or 1*d*-35 may denote a function of delivering RLC SDUs received from a lower layer, to a higher layer in order. When one RLC SDU is segmented into a plurality of RLC SDUs and received, the in-sequence delivery of the NR RLC layer 1*d*-10 or 1*d*-35 may include reassembly and delivery functions.

The in-sequence delivery of the NR RLC layer 1*d*-10 or 1*d*-35 may include a function of reordering received RLC PDUs on an RLC SN or PDCP SN basis, a function of recording missing RLC PDUs by reordering the RLC PDUs, a function of reporting state information of the missing RLC PDUs to a transmitter, and a function of requesting to retransmit the missing RLC PDUs.

The in-sequence delivery of the NR RLC layer 1*d*-10 or 1*d*-35 may include a function of delivering only RLC SDUs previous to a missing RLC SDU, to the higher layer in order, when the missing RLC SDU exists. The in-sequence delivery of the NR RLC layer 1*d*-10 or 1*d*-35 may include a function of delivering all RLC SDUs received before a certain timer starts, to the higher layer in order, when the certain timer expired despite of a missing RLC SDU. Also, the in-sequence delivery of the NR RLC layer 1*d*-10 or 1*d*-35 may include a function of delivering all RLC SDUs currently received to the higher layer in order, when a certain timer expired despite of a missing RLC SDU.

The NR RLC layer 1*d*-10 or 1*d*-35 may process the RLC PDUs in an order of reception regardless of an order of sequence numbers (out-of-sequence delivery) and deliver the same to the NR PDCP layer 1*d*-05 or 1*d*-40.

When the NR RLC layer 1*d*-10 or 1*d*-35 receives segments, the NR RLC layer 1*d*-10 or 1*d*-35 may receive the segments to be received later or stored in a buffer, reassemble the same into a whole RLC PDU, and deliver the same to the NR PDCP layer 1*d*-05 or 1*d*-40.

The NR RLC layer 1*d*-10 or 1*d*-35 may not have a concatenation function, and the concatenation function may be performed by the NR MAC layer 1*d*-15 or 1*d*-30 or be replaced with a multiplexing function of the NR MAC layer 1*d*-15 or 1*d*-30.

In the above description, out-of-sequence delivery of the NR RLC layer 1*d*-10 or 1*d*-35 may denote a function of delivering RLC SDUs received from a lower layer, immediately to a higher layer out of an order. The out-of-sequence delivery of the NR RLC layer 1*d*-10 or 1*d*-35 may include a function of reassembling several RLC SDUs when originally one RLC SDU is segmented and received in the several RLC SDUs. The out-of-sequence delivery of the NR RLC layer 1*d*-10 or 1*d*-35 may include a function of storing RLC SNs or PDCP SNs of received RLC PDUs and recording missing RLC PDUs by aligning the received RLC PDUs in an order.

The NR MAC layer 1*d*-15 or 1*d*-30 may be connected to multiple NR RLC layers 1*d*-10 or 1*d*-35 configured for a single UE, and main functions of the NR MAC layer 1*d*-15 or 1*d*-30 may include at least some of the following functions.

Mapping between logical channels and transport channels
    Multiplexing/demultiplexing of MAC SDUs
    Scheduling information reporting
    Error correction through HARQ
    Priority handling between logical channels of one UE
    Priority handling between UEs by means of dynamic scheduling
    MBMS identification
    Transport format selection
    Padding An NR PHY layer 1*d*-20 or 1*d*-25 may channel-code and modulate higher layer data into OFDM symbols and transmit the OFDM symbols through a radio channel, or demodulate OFDM symbols received through a radio channel and channel-decode and deliver the OFDM symbols to a higher layer.

Figure 1E:
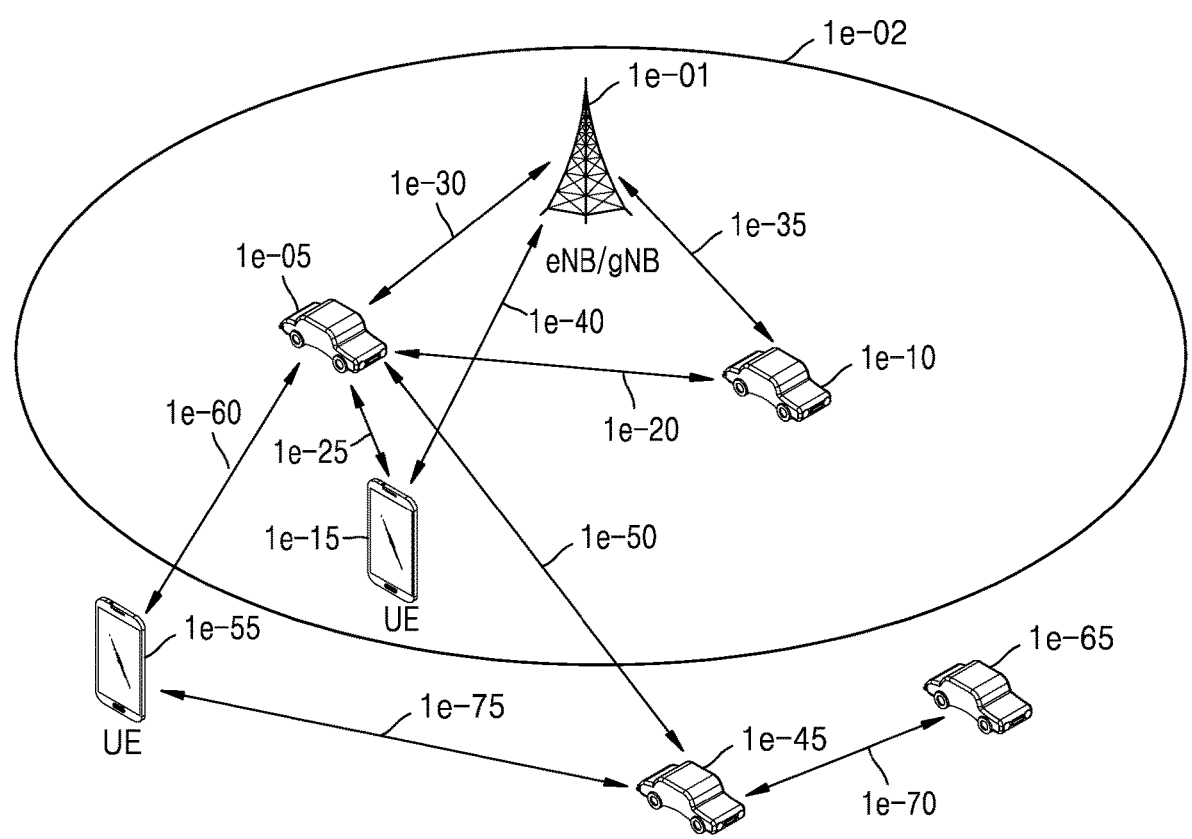
FIG. 1E is a diagram for describing vehicle-to-everything (V2X) communication of a next-generation mobile communication system, according to an embodiment of the disclosure.

FIG. 1E is a diagram for describing vehicle-to-everything (V2X) communication of a next-generation mobile communication system, according to an embodiment of the disclosure.

V2X according to an embodiment of the disclosure commonly refers to communication technology using a vehicle and all interfaces, and includes vehicle-to-vehicle (V2V), vehicle-to-infrastructure (V2I), vehicle-to-pedestrian (V2P), or vehicle-to-network (V2N), depending on a shape thereof and components providing communication.

Referring to FIG. 1E, an eNB/gNB 1*e*-01 may include at least one vehicle terminal 1*e*-05 or 1*e*-10 and a pedestrian mobile terminal 1*e*-15, which are located within a cell 1*e*-02 supporting V2X. Here, the V2X is supportable through a Uu interface and/or a PC5 interface. When the V2X is supported through the Uu interface, for example, the vehicle terminal 1*e*-05 or 1*e*-10 may perform V2X cellular communication with the eNB/gNB 1*e*-01 by using vehicle terminal-base station UL/DL 1*e*-30 or 1*e*-35. Alternatively, the pedestrian mobile terminal 1*e*-15 may perform V2X cellular communication by using pedestrian terminal-base station UL/DL 1*e*-40. When the V2X is supported through a PC5 interface, V2X sidelink (SL) communication may be performed by using terminal-to-terminal SL 1*e*-20 or 1*e*-25. For example, the vehicle terminal 1*e*-05 in coverage of a base station (E-TURA/NR) may transmit or receive a V2X packet to or from another vehicle terminal 1*e*-10 or 1*e*-45 and/or a pedestrian mobile terminal 1*e*-15 or 1*e*-55, via SL 1*e*-20, 1*e*-50, 1*e*-25, or 1*e*-60, i.e., a transmission channel. The V2X packet may be transmitted or received in a broadcast transmission type and/or a unicast and/or groupcast transmission type.

A terminal supporting V2X SL communication may transmit or receive the V2X packet in a resource allocation mode (scheduled resource allocation or UE autonomous resource selection). According to an embodiment, the scheduled resource allocation (mode 1 and/or mode 3) may denote a mode in which a base station allocates a resource to be used in SL transmission to an RRC connected mode terminal, via a dedicated scheduling method. The mode may be effective in interference management and/or management of a resource pool (dynamic allocation or semi-persistence transmission) because the base station is able to manage resources of SL. According to an embodiment, when there is data to be transmitted to other terminal(s), the RRC connected mode terminal may notify the base station that there is the data to be transmitted to the other terminal(s) by using an RRC message or an MAC control element (CE). For example, the RRC message may use SidelinkUEInformation, an UEAssistanceInformation message, or the like, and the MAC CE may use a buffer status report MAC CE in a new format (including at least an indicator indicating a buffer status report for V2X communication and information about a data size buffered for SL communication), or the like.

According to an embodiment, the UE autonomous resource selection (mode 2 and/or mode 4) may denote a mode in which a base station provides system information and/or SL resource information/pool via an RRC message, to a terminal supporting V2X SL communication, and the terminal selects a resource according to a determined rule. For example, the base station may provide SL resource information to the terminal by signaling a system information block (SIB)21, an SIB26, or an SIBx to be newly defined for an NR V2X UE. According to an embodiment, the RRC message may include an RRC connection reconfiguration message (RRCReconfiguration message) or a connection resume message (RRCResume message). For example, the base station may provide, to the terminal, the SL resource information by signaling, to the terminal, the RRC message, such as the RRC connection reconfiguration message (RRCReconfiguration message) and/or the connection resume message (RRCResume message). Also, in the UE autonomous resource selection, the terminal may help other terminal(s) to select a resource to be used in SL, through a PC5-RRC message and/or MAC CE, or allocate a resource to be used in SL transmission through scheduling or directly/indirectly. In other words, the UE autonomous resource selection mode may indicate one or more modes below.

- UE autonomously selects sidelink resource for transmission
- UE assists sidelink resource selection for other UEs
- UE is configured with NR configured grant for sidelink transmission
- UE schedules sidelink transmission of other UEs According to an embodiment, a resource selecting method of the terminal may include zone mapping, sensing-based resource selection, random selection, configured grant-based resource selection, or the like.

According to an embodiment, the terminal supporting the V2X SL communication may transmit or receive the V2X packet, based on a pre-configured resource pool (preconfiguration resource), by being included in SL-V2X-Preconfiguration that is an information element (IE). For example, when the terminal is unable to perform the V2X SL communication based on the scheduled resource allocation and/or UE autonomous resource selection mode due to certain reasons, despite that the terminal is in coverage of the base station, the terminal may perform the V2X SL communication via an SL transmission/reception resource pool preconfigured in the SL-V2X-Preconfiguration that is the IE. Also, the vehicle terminal 1*e*-45 out-of-coverage of the base station (E-UTRA/NR) may perform the V2X SL communication with the other vehicle terminal 1*e*-65 or the pedestrian mobile terminal 1*e*-55, based on the SL preconfiguration resource via SL 1*e*-70 or 1*e*-75.

LTE V2X SL communication is designed mainly for a basic safety service. In other words, the terminal supporting the LTE V2X SL communication is designed to provide, via a broadcast transmission type, the basic safety service to all adjacent terminals supporting the LTE V2X SL communication. Accordingly, the terminal is not required to perform a process of separately establishing a session with another specific terminal or perform an SL connection establishment procedure.

However, the V2X SL communication may be designed to provide not only the basic safety service, but also provide various improved services (for example, an autonomous driving service, a platooning service, a remote driving service, and in-vehicle infotainment) in a next-generation mobile communication (NR). Accordingly, NR V2X SL communication may be designed to support not only a broadcast transmission type, but also provide a unicast and/or groupcast transmission type.

Figure 1F:
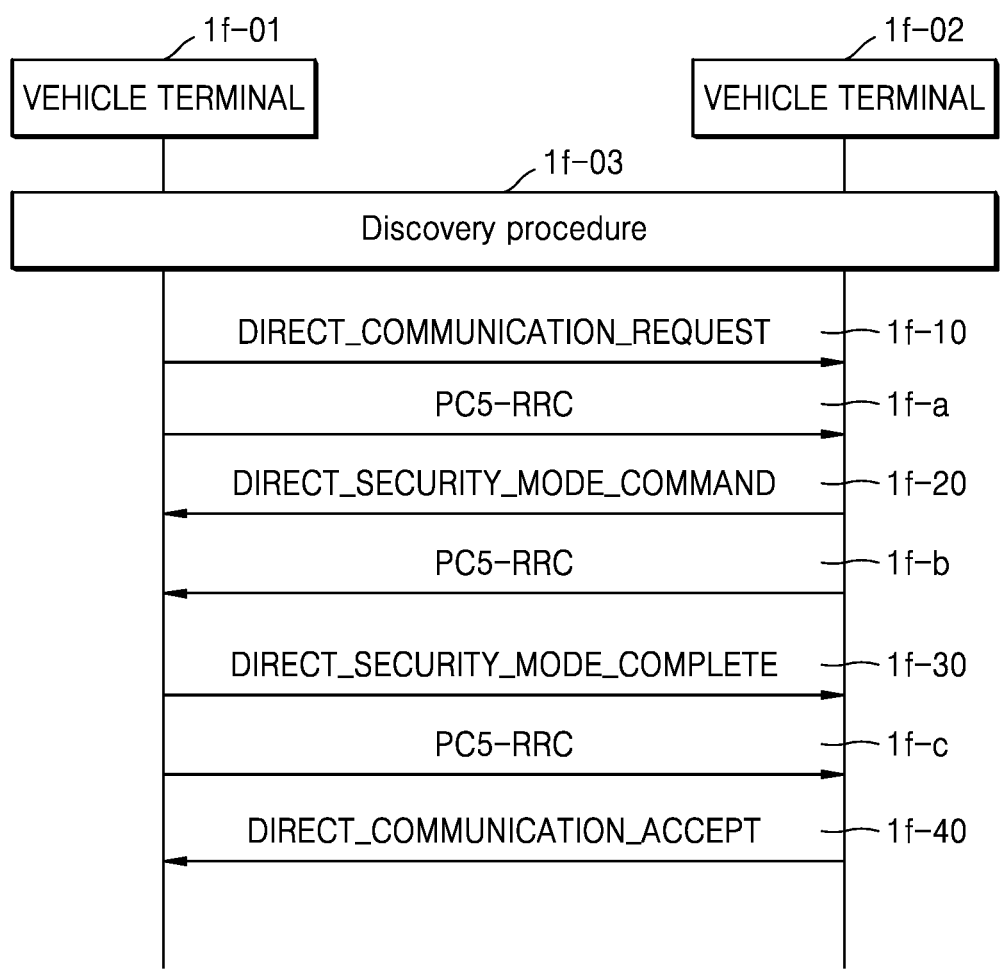
FIG. 1F is a diagram for describing a unicast link establishment procedure for supporting a new radio (NR) V2X sidelink (SL) unicast, according to an embodiment of the disclosure.

FIG. 1F is a diagram for describing a unicast link establishment procedure for supporting an NR V2X SL unicast, according to an embodiment of the disclosure.

Referring to FIG. 1F, a vehicle terminal 1*f*-01 may perform, in operation 1*f*-03, a discovery procedure with another vehicle terminal 1*f*-02, for terminal-to-terminal unicast link establishment. Accordingly, the vehicle terminal 1*f*-01 may obtain a link layer identifier of the other vehicle terminal 1*f*-02. For example, the link layer identifier may denote a Layer 2 ID, a destination Layer 2 ID, or a destination ID used for NR V2X SL unicast communication.

When operation 1*f*-03 is completed, the vehicle terminal 1*f*-01 may perform an upper layer connection establishment procedure and/or an AS layer connection establishment procedure with the other vehicle terminal 1*f*-02 for terminal-to-terminal sidelink connection establishment. In the disclosure, for convenience of description, the AS layer connection establishment procedure is described after describing the upper layer connection establishment procedure, but the upper layer connection establishment procedure and the AS layer connection establishment procedure may be performed independently, parallelly, or through a series of processes.

The upper layer connection establishment procedure may be performed through a following series of processes (operations 1*f*-10, 1*f*-20, 1*f*-30, and 1*f*-40) between terminals, based on a PC5 signaling protocol procedure defined in Rel-15 D2D.

The vehicle terminal 1*f*-01 transmits a DIRECT_COMMUNICATION_REQUEST message to the other vehicle terminal 1*f*-02 (operation 1*f*-10):

The DIRECT_COMMUNICATION_REQUEST message is a first PC5 signaling message transmitted by the vehicle terminal 1f-01 to the other vehicle terminal 1f-02 to request direct link establishment (Also referred to as a PC5 signaling message because the DIRECT_COMMUNICATION_REQUEST message is generated through a PC5 signaling protocol).

The vehicle terminal 1f-01 receives a DIRECT_SECURITY_MODE_COMMAND message from the other vehicle terminal 1f-02 (operation 1f-20):

The DIRECT_SECURITY_MODE_COMMAND message is a first PC5 signaling message transmitted by the other vehicle terminal 1f-02 to the vehicle terminal 1f-01 to establish a direct security mode during the direct link establishment (Also referred to as a PC5 signaling message because the DIRECT_SECURITY_MODE_COMMAND message is generated through a PC5 signaling protocol).

The vehicle terminal 1f-01 transmits a DIRECT_SECURITY_MODE_COMPLETE message to the other vehicle terminal 1f-02 (operation 1f-30):

The DIRECT_SECURITY_MODE_COMPLETE message is a PC5 signaling message for the vehicle terminal 1f-01 to notify the other vehicle terminal 1f-02 that the direct security mode has been successfully established/completed during the direct link establishment (Also referred to as a PC5 signaling message because the DIRECT_SECURITY_MODE_COMPLETE message is generated through a PC5 signaling protocol).

The other vehicle terminal 1f-02 transmits a DIRECT COMMUNICATION ACCEPT to the vehicle terminal 1f-01 (operation 1f-40):

The DIRECT COMMUNICATION ACCEPT message is a PC5 signaling message for the other vehicle terminal 1f-02 to notify the vehicle terminal 1f-01 that a direct link has been successfully established (Also referred to as a PC5 signaling message because the DIRECT COMMUNICATION ACCEPT message is generated through a PC5 signaling protocol).

A PC5 signaling message transmitted/received during the above-described upper layer connection establishment procedure may partially include or may not include some AS layer parameters and configuration information, which are required for establishing a V2X SL connection between terminals. Accordingly, not only the upper layer connection establishment procedure, but also the AS layer connection establishment procedure may be required to establish the V2X SL connection between terminals.

The AS layer connection establishment procedure according to an embodiment of the disclosure may indicate that the vehicle terminal 1f-01 and the other vehicle terminal 1f-01 exchange an AS layer parameter and configuration information, which are required to establish a V2X SL connection or required for NR V2X SL unicast communication, through a PC5 RRC message. The PC5 RRC message may be generated in an RRC layer and transmitted/received through a logical channel to be newly defined in NR. For example, the logical channel may be referred to as a sidelink control channel (SCCH).

PC5 RRC messages 1f-a and/or 1f-b and/or 1f-c according to an embodiment of the disclosure may include at least one of following AS layer parameter or configuration information.

Indicator or IE asking or indicating whether V2X SL unicast communication is supportable (or intent thereof)

It may be identified whether V2X SL communication between terminals is to be performed in a unicast, through the indicator or IE. For example, the vehicle terminal 1f-01 may ask whether a V2X SL unicast is supported by transmitting a PC5 RRC message to the other vehicle terminal 1f-02, and in response, the other vehicle terminal 1f-02 may transmit a PC5 RRC message to the vehicle terminal 1f-01 to notify that V2X SL unicast communication is possible.

UE ID: Terminal identifier

Terminals that perform or are to perform V2X SL unicast communication may identify each other through the UE ID. For example, the UE ID may denote a source Layer-2 ID and/or a destination Layer-2 ID of a target UE for unicast (here, the target UE may denote the vehicle terminal 1f-01 and/or the other vehicle terminal 1f-02). Alternatively, the UE ID may be a new radio network temporary identifier (RNTI) identifiable between terminals, and an HARQ process between terminals may be performed based on the RNTI.

Radio bearer configuration information

An SRB ID regarding an SRB and/or a DRB ID regarding a DRB and/or configuration information related to a PDCP layer and/or configuration information related to an SDAP layer, which are used for NR V2X SL unicast communication between vehicle terminals, may be exchanged through radio bearer configuration information. For example, the radio bearer configuration information may include some or all of srb-ToAddModList, drb-ToAddModList, drb-ToReleaseList, and securityConfig, which are IEs.

RLC bearer configuration information

An ID regarding an SRB and/or DRB, a logical channel ID (LCH-ID), an indicator indicating whether an RLC layer needs to be reestablished, configuration information related to an RLC layer, and MAC-logical channel configuration information, which are used for NR V2X SL unicast communication between vehicle terminals, may be exchanged through RLC bearer configuration information.

Configuration information for performing HARQ process

Retransmission may be performed through an HARQ process during NR V2X SL unicast communication between vehicle terminals, through configuration information. For example, the configuration information may include a timer, a retransmission cycle, and the like required for the retransmission.

Radio link failure (RLF) timer values and related constant configuration information Information about a condition for detecting RLF during NR V2X SL unicast communication between vehicle terminals may be included through RLF timer values and the related constant configuration information. The information may include at least one of values regarding A through F below.

During NR V2X SL unicast communication, a lower layer of a vehicle terminal may transmit, to a higher layer, an "out-of-sync" indication due to a certain reason. For example, the lower layer of the vehicle terminal may transmit the "out-of-sync" indication to the higher layer when the vehicle terminal fails to decode (decoding failure) a physical sidelink control channel (PSCCH) consecutively during an A slot. When the higher layer of vehicle terminal receives the "out-of-sync" indication B times consecutively from the lower layer, the vehicle terminal may start a timer C. While the timer C is running, the lower layer of the vehicle terminal may transmit, to the higher layer, an "in-sync" indication due to a certain reason. For example, when the vehicle terminal successfully decodes (decoding success) the PSCCH consecutively during a D slot, the lower layer of the vehicle terminal may transmit the "in-sync" indication to the higher layer. When the higher layer of the vehicle terminal receives the "in-sync" indication E times consecutively from the lower layer, the timer C may be stopped. When the timer C expires, the vehicle terminal may detect that RLF has occurred in a V2X sidelink connected for the NR V2X unicast communication. When the RLF is detected, a timer F may operate. The operated timer F may stop when a PC5 signaling message is received, when a PC5 RRC message is transmitted, when a PC5 RRC message is received, when a PC5 MAC CE is transmitted, or when a PC5 MAC CE is received.

A through F described above may have following values.

A:
One value indicating a slot number or one of a plurality of values indicating slot numbers may be included in a PC5 RRC message. For example, A may be represented in a form of ENUMERATED {n1, n2, n3, . . . }, wherein n1, n2, and n3 each denote a value indicating a slot number.

A plurality of values among a plurality of values indicating a slot number may be included in a PC5 RRC message. For example, A may be represented in a form of SEQUENCE (SIZE (1 . . . m)) of a, wherein a may be represented in a form of ENUMERATED {n1, n2, n3, . . . }. Here, A may denote a list or group of a plurality of values (m) indicating a slot number. A plurality of slot values are required because a QoS requirement for each NR V2X use case may vary or because a slot value may be set differently for each NR V2X SL unicast session.

B:
One constant or one of a plurality of constants may be included in a PC5 RRC message. For example, B may be represented in a form of ENUMERATED {n1, n2, n3, . . . }, wherein n1, n2, and n3 each denote a constant.

A plurality of constants among a plurality of constants may be included in a PC5 RRC message. For example, B may be represented in a form of SEQUENCE (SIZE (1 . . . m)) of b, wherein b is in a form of ENUMERATED {n1, n2, n3, . . . }. Here, B may denote a list or group of a plurality of constants (m). A plurality of constants are required because a QoS requirement for each NR V2X use case may vary or because a constant may be set differently for each NR V2X SL unicast session.

B may indicate N310 used in a Uu interface, or may be a new constant(s) used separately in a PC5 interface. In the latter case, B may have a range of constants more various than constants defined in N310, a same range of constants, or a range of fewer constants.

C:
One value indicating a timer value or one of a plurality of values indicating timer values may be included in a PC5 RRC message. For example, C may be represented in a form of ENUMERATED {n1, n2, n3, . . . }, wherein values of n1, n2, and n3 each denote a time/timer value using units of milliseconds (ms).

A plurality of values among a plurality of values indicating a timer value may be included in a PC5 RRC message. C may be represented in a form of SEQUENCE (SIZE (1 . . . m)) of c, wherein c is in a form of ENUMERATED {n1, n2, n3, . . . }. Here, C may denote a list or group of a plurality of timer/time values (m). A plurality of timer/time values are required because a QoS requirement for each NR V2X use case may vary or because a timer/time value may be set differently for each NR V2X SL unicast session.

C may indicate T310 used in a Uu interface, or may be a new value(s) used separately in a PC5 interface. In the latter case, C may have a range of value more various than values defined in T310, a same range of values, or a range of fewer values.

D:
One value indicating a slot number or one of a plurality of values indicating slot numbers may be included in a PC5 RRC message. For example, D may be represented in a form of ENUMERATED {n1, n2, n3, . . . }, wherein n1, n2, and n3 each denote a value indicating a slot number.

A plurality of values among a plurality of values indicating a slot number may be included in a PC5 RRC message. For example, D may be represented in a form of SEQUENCE (SIZE (1 . . . m)) of d, wherein d may be represented in a form of ENUMERATED {n1, n2, n3, . . . }. Here, D may denote a list or group of a plurality of values (m) indicating a slot number. A plurality of slot values are required because a QoS requirement for each NR V2X use case may vary or because a slot value may be set differently for each NR V2X SL unicast session.

E:
One constant or one of a plurality of constants may be included in a PC5 RRC message. For example, E may be represented in a form of ENUMERATED {n1, n2, n3, . . . }, wherein n1, n2, and n3 each denote a constant.

A plurality of constants among a plurality of constants may be included in a PC5 RRC message. For example, E may be represented in a form of SEQUENCE (SIZE (1 . . . m)) of e, wherein e is in a form of ENUMERATED {n1, n2, n3, . . . }. Here, E may denote a list or group of a plurality of constants (m). A plurality of constants are required because a QoS requirement for each NR V2X use case may vary or because a constant may be set differently for each NR V2X SL unicast session.

E may indicate N311 used in a Uu interface, or may be a new constant(s) used separately in a PC5 interface. In the latter case, E may have a range of constants more various than constants defined in N311, a same range of constants, or a range of fewer constants.

F:
One value indicating a timer value or one of a plurality of values indicating timer values may be included in a PC5 RRC message. For example, F may be represented in a form of ENUMERATED {n1, n2, n3, . . . }, wherein values of n1, n2, and n3 each denote a time/timer value using units of milliseconds (ms).

A through F described above and/or corresponding values may be always mandatorily included in a PC5 RRC message or may be optionally included in the PC5 RRC message.

Values of A through F described above may be included in an RRC message (for example, an RRC connection reconfiguration message or an RRC connection resume message) dedicatedly signaled by a base station to a terminal, or may be included in system information.

QoS-related configuration information: List/group of 5G QoS indicators (5QI) or V2X QoS indicators (VQI)

QoS information required in a V2X service desired during NR V2X SL unicast communication between vehicle terminals may be indicated through QoS-related configuration information. For example, the QoS-related configuration information may include a list of 5QI or VQI.

QoS-related configuration information: IE including traffic pattern information, and/or list of ProSe per-packet priority (PPPP) and/or ProSe per-packet reliability (PPPR)

Through QoS-related configuration information, QoS information required for a V2X service required during NR V2X SL unicast communication between vehicle terminals may be indicated, or information of performing packet duplication, performing SPS, ConfiguredGrant Type 1, or ConfiguredGrant Type 2 may be indicated. For example, the IE may include PPPPInfoSL and/or reliabilityInfoListSL and/or SL-V2X-PacketDuplicationConfig and/or trafficPatternInfoListSL.

IE including traffic pattern information, and/or list of PPPP and/or PPPR:

Through the IE, QoS information required for a V2X service required during NR V2X SL unicast communication between vehicle terminals may be indicated, or information of performing packet duplication, performing SPS, ConfiguredGrant Type 1, or ConfiguredGrant Type 2 may be indicated. For example, the IE may include PPPPInfoSL and/or reliabilityInfoListSL and/or SL-V2X-PacketDuplicationConfig and/or trafficPatternInfoListSL.

IE including traffic pattern information, and/or list of PPPP and/or PPPR:

Through the IE, QoS information required for a V2X service required during NR V2X SL unicast communication between vehicle terminals may be indicated, or information of performing packet duplication, performing SPS, ConfiguredGrant Type 1, or ConfiguredGrant Type 2 may be indicated. For example, the IE may include PPPPInfoSL and/or reliabilityInfoListSL and/or SL-V2X-PacketDuplicationConfig and/or trafficPatternInfoListSL.

Indicator or IE explicitly indicating whether or not to use preconfiguration transmission resource pool and/or reception resource pool:

Through the indicator or IE, it may be determined whether to use a preconfiguration transmission resource pool or reception resource pool, or whether to use a resource allocation mode-based transmission resource pool or reception resource pool during NR V2X SL unicast communication between vehicle terminals.

Indicator explicitly indicating resource allocation mode or IE including information of resource allocation mode-based transmission response pool and/or reception resource pool or partial information of preconfiguration transmission resource pool and/or reception resource pool:

Through the indicator or IE, it may be determined whether to use a partial resource pool of a preconfiguration transmission resource pool or reception resource pool, or whether to use a resource allocation mode-based transmission resource pool or reception resource pool during NR V2X SL unicast communication between vehicle terminals.

The AS layer connection establishment procedure according to an embodiment of the disclosure may be performed independently from the upper layer connection establishment procedure, in parallel to the upper layer connection establishment procedure, or through a series of processes. Accordingly, in the disclosure, time points when the PC5 RRC messages 1*f-a*, 1*f-b*, and 1-*fc* are transmitted are proposed.

The first PC5 RRC message 1*f-a* transmitted by the vehicle terminal 1*f*-01 to the other vehicle terminal 1*f*-02 to perform the AS layer connection establishment procedure may be transmitted before the DIRECT_COMMUNICATION_REQUEST message is transmitted (operation 1*f*-10), transmitted simultaneously with the DIRECT_COMMUNICATION_REQUEST message (operation 1*f*-10), transmitted by being multiplexed with the DIRECT_COMMUNICATION_REQUEST message (operation 1*f*-10), transmitted after the DIRECT_COMMUNICATION_REQUEST message is transmitted (operation 1*f*-10), transmitted after the DIRECT_SECURITY_MODE_COMMAND message is received (operation 1*f*-20), transmitted before the DIRECT_SECURITY_MODE_COMPLETE message is transmitted (operation 1*f*-30), transmitted simultaneously with the DIRECT_SECURITY_MODE_COMPLETE message (operation 1*f*-30), transmitted by being multiplexed with the DIRECT_SECURITY_MODE_COMPLETE message (operation 1*f*-30), transmitted after the DIRECT_SECURITY_MODE_COMPLETE message is transmitted (operation 1*f*-30), or transmitted after the DIRECT COMMUNICATION ACCEPT message is received (operation 1*f*-40).

When the other vehicle terminal 1*f*-02 has received the PC5 RRC message 1*f-a* from the vehicle terminal 1*f*-01, the other vehicle terminal 1*f*-02 may transmit the PC5 RRC message 1*f-b* to the vehicle terminal 1*f*-01 in response thereto. The PC5 RRC message 1*f-b* may be transmitted after the PC5 RRC message 1*f-a* is received, transmitted before the DIRECT_SECURITY_MODE_COMMAND message is transmitted (operation 1*f*-20), transmitted simultaneously with the DIRECT_SECURITY_MODE_COMMAND message (operation 1*f*-20), transmitted by being multiplexed with the DIRECT_SECURITY_MODE_COMMAND message (operation 1*f*-20), transmitted after the DIRECT_SECURITY_MODE_COMMAND message is transmitted (operation 1*f*-20), transmitted after the DIRECT_SECURITY_MODE_COMPLETE message is received (operation 1*f*-30), transmitted before the DIRECT_COMMUNICATION_ACCEPT message is transmitted (operation 1*f*-40), transmitted simultaneously with the DIRECT_COMMUNICATION_ACCEPT message (operation 1*f*-40), transmitted by being multiplexed with the DIRECT_COMMUNICATION_ACCEPT message (operation 1*f*-40), or transmitted after the DIRECT_COMMUNICATION_ACCEPT message is transmitted (operation 1*f*-40).

When the vehicle terminal 1*f*-01 has received the PC5 RRC message 1*f-b* from the other vehicle terminal 1*f*-02, the vehicle terminal 1*f*-01 may or may not transmit the PC5

RRC message 1*f-c* to the other vehicle terminal 1*f*-02 in response thereto. For example, when the AS layer connection establishment procedure and the upper layer connection establishment procedure are performed through a series of processes, the vehicle terminal 1*f*-01 may transmit, to the other vehicle terminal 1*f*-02, a response to the PC5 RRC message 1*f-b* through a PC5 signaling message, and thus may not transmit the PC5 RRC message 1*f-c*. When the PC5 RRC message 1*f-c* is to be transmitted, the PC5 RRC message 1*f-c* may be

- transmitted after the PC5 RRC message 1*f-b* is received, transmitted before the DIRECT_COMMUNICATION_REQUEST message is transmitted (operation 1*f*-10),
- transmitted simultaneously with the DIRECT_COMMUNICATION_REQUEST message (operation 1*f*-10),
- transmitted by being multiplexed with the DIRECT_COMMUNICATION_REQUEST message (operation 1*f*-10),
- transmitted after the DIRECT_COMMUNICATION_REQUEST message is transmitted (operation 1*f*-10),
- transmitted after the DIRECT_SECURITY_MODE_COMMAND message is received (operation 1*f*-20),
- transmitted before the DIRECT_SECURITY_MODE_COMPLETE message is transmitted (operation 1*f*-30),
- transmitted simultaneously with the DIRECT_SECURITY_MODE_COMPLETE message (operation 1*f*-30),
- transmitted by being multiplexed with the DIRECT_SECURITY_MODE_COMPLETE message (operation 1*f*-30),
- transmitted after the DIRECT_SECURITY_MODE_COMPLETE message is transmitted (operation 1*f*-30), or
- transmitted after the DIRECT_COMMUNICATION_ACCEPT message is received (operation 1*f*-40).

FIG. 1G is a diagram for describing a method by which a reception UE transmits a measurement value of Layer 3 (L3) filtered sidelink reference signal received power (SL-RSRP) to a transmission UE, during sidelink unicast communication, according to an embodiment of the disclosure.

Referring to FIG. 1G, two UEs 1*g*-01 and 1*g*-02 may establish a PC5-RRC connection by performing a PC5-RRC connection procedure for SL unicast communication (operation 1*g*-05). Here, the transmission (TX) UE 1*g*-01 may transmit, to the reception (RX) UE 1*g*-02, a PC5-RRC message containing an indicator to report an SL-RSRP measurement value. The PC5-RRC message may denote a UE capability request message, a UE capability information message, or an AS configuration information message. Alternatively, the RX UE 1*g*-02 may transmit, to the TX UE 1*g*-01, a PC5-RRC message containing an indicator that the SL-RSRP measurement value is reportable. The PC5-RRC message may denote a UE capability request message, a UE capability information message, or an AS configuration information message.

In operation 1*g*-10, the RX UE 1*g*-02 in an RRC idle mode (RRC_IDLE) or RRC inactive mode (RRC_INACTIVE) may obtain, from a gNB/eNB 1*g*-03, system information containing V2X SL configuration information. The system information may include measurement configuration information for Layer 3 filtered SL-RSRP. The measurement configuration information may include at least one of the followings.

- One or a plurality of FilterCoefficient values for SL unicast communication. The value may be set differently from a value used between a UE and a base station.
- A timer value for periodically reporting an SL-RSRP measurement value.
- A measurement period value indicating a period for performing Layer 3 filtering.
- A certain value (Fdelta) indicating a difference between a current SL-RSRP measurement value and an SL-RSRP measurement value most recently transmitted when transmitting an SL-RSRP measurement value. A unit of the value may be dB.
- A specific threshold value range of a Layer 3 filtered SL-RSRP measurement value.

The measurement configuration information may be configured for each reception resource pool, configured regardless of a reception resource pool, configured for each SL QoS profile, configured for each QoS flow, or configured for each destination.

In operation 1*g*-10, the RX UE 1*g*-02 in an RRC connected mode (RRC_CONNECTED) may obtain, from the gNB/eNB 1*g*-03, a dedicated message (for example, RRCReconfiguration) containing the V2X SL configuration information. The message may include measurement configuration information for Layer 3 filtered SL-RSRP. The measurement configuration information may include at least one of the followings.

- One or a plurality of FilterCoefficient values for SL unicast communication. The value may be set differently from a value used between a UE and a base station.
- A timer value for periodically reporting an SL-RSRP measurement value.
- A measurement period value indicating a period for performing Layer 3 filtering.
- A certain value (Fdelta) indicating a difference between a current SL-RSRP measurement value and an SL-RSRP measurement value most recently transmitted when transmitting an SL-RSRP measurement value. A unit of the value may be dB.
- A specific threshold value range of a Layer 3 filtered SL-RSRP measurement value.

The measurement configuration information may be configured for each reception resource pool, configured regardless of a reception resource pool, configured for each SL QoS profile, configured for each QoS flow, or configured for each destination.

In operation 1*g*-15, the TX UE 1*g*-01 may transmit a physical sidelink shared channel (PSSCH) to the RX UE 1*g*-02 (operation 1*g*-15). The RX UE 1*g*-02 may operate a timer upon receiving a first PSSCH from the TX UE 1*g*-01. The timer may denote a timer newly introduced to report an SL-RSRP measurement value. The RX UE 1*g*-02 may operate the timer by applying a timer value configured by the gNB/eNB 1*g*-03. Alternatively, the RX UE 1*g*-02 may operate the timer by applying a timer value pre-set internally. Alternatively, the RX UE 1*g*-02 may operate the timer when a specific PC5-RRC message is received from the TX UE 1*g*-01, in operation 1*g*-05. In the present embodiment, the timer may be referred to as T3xx for convenience of description.

In operation 1*g*-20, the RX UE 1*g*-02 may perform Layer 3 filtering to derive the SL-RSRP measurement value. The Layer 3 filtering may be performed by applying Equation 1 below.

$$F_n = (1-a)*F_{n-1} + a*M_n \qquad \text{Equation 1}$$

$M_n$ is the latest received measurement result from the physical layer;

$F_n$ is the updated filtered measure result, that is used for evaluation of reporting criteria or for measurement reporting;

$F_{n-1}$ is the old filtered measurement result, where $F_0$ is set to $M_1$ when the first measurement result from the physical layer is received; and for NR, $a=\frac{1}{2}^{(k/4)}$, where $k_i$ is the SL-filterCoefficient for the corresponding measurement In operation 1g-20, the RX UE 1g-02 may perform the Layer 3 filtering when the TX UE 1g-01 transmits the PSSCH. When the measurement period value indicating the period of performing the Layer 3 filtering is received from the gNB/eNB 1g-03, the RX UE 1g-02 may derive the SL-RSRP measurement value by performing the Layer 3 filtering for each period. When the measurement period value indicating the period of performing the Layer 3 filtering is not received from the gNB/eNB 1g-03, the RX UE 1g-02 may derive the SL-RSRP measurement value by performing the Layer 3 filtering for each pre-determined period. When the PSSCH is not received from the TX UE 1g-01 during the period, the RX UE 1g-02 may replace a current SL-RSRP measurement value with a previously derived SL-RSRP measurement value or initialize a value of Fn to 0.

In operation 1g-25, the RX UE 1g-02 may determine whether to report the Layer 3 filtered SL-RSRP measurement value to the TX UE 1g-01 as a certain condition is met. The certain condition may denote one of the followings.
  When the operated T3xx expires.
  When the Layer 3 filtered SL-RSRP measurement value is equal to or greater than a specific value.
  When the Layer 3 filtered SL-RSRP measurement value is less than or equal to a specific value.
  When the Layer 3 filtered SL-RSRP measurement value exists for a specific period of time.
  When the Layer 3 filtered SL-RSRP measurement value is included or not included in a specific threshold value range.

In operation 1g-30, the RX UE 1g-02 may transmit, to the TX UE 1g-01, the Layer 3 filtered SL-RSRP measurement value. The Layer 3 filtered SL-RSRP measurement value may be transmitted by being included in a PC5 MAC CE or PC5 RRC message. When the Layer 3 filtered SL-RSRP measurement value is transmitted, the RX UE 1g-02 may restart the operating T3xx timer.

In operation 1g-35, the TX UE 1g-01 may apply open-loop power control based on the received Layer 3 filtered SL-RSRP measurement value. The open-loop power control may denote adjusting TX power when transmitting a next PSSCH by estimating or calculating a path loss, based on the received Layer 3 filtered SL-RSRP measurement value.

In operation 1g-40, the TX UE 1g-01 may transmit, to the RX UE 1g-02, the PSSCH based on newly applied TX power.

In operation 1g-45, the RX UE 1g-02 may determine whether to report the Layer 3 filtered SL-RSRP measurement value to the TX UE 1g-01 as a certain condition is met. The certain condition may denote one of the followings.
  When the operated T3xx expires.
  When a difference between the previously transmitted SL-RSRP measurement value and the current SL-RSRP measurement value is equal to or greater than specific dB. The specific dB may denote a certain value indicating a difference of the SL-RSRP measurement value received from the gNB/eNB 1g-03 in operation 1g-10, or a value pre-set in the UE (RX UE 1g-02).

In operation 1g-50, the RX UE 1g-02 may transmit, to the TX UE 1g-01, the Layer 3 filtered SL-RSRP measurement value. The Layer 3 filtered SL-RSRP measurement value may be transmitted by being included in a PC5 MAC CE or PC5 RRC message.

Figure 1H:
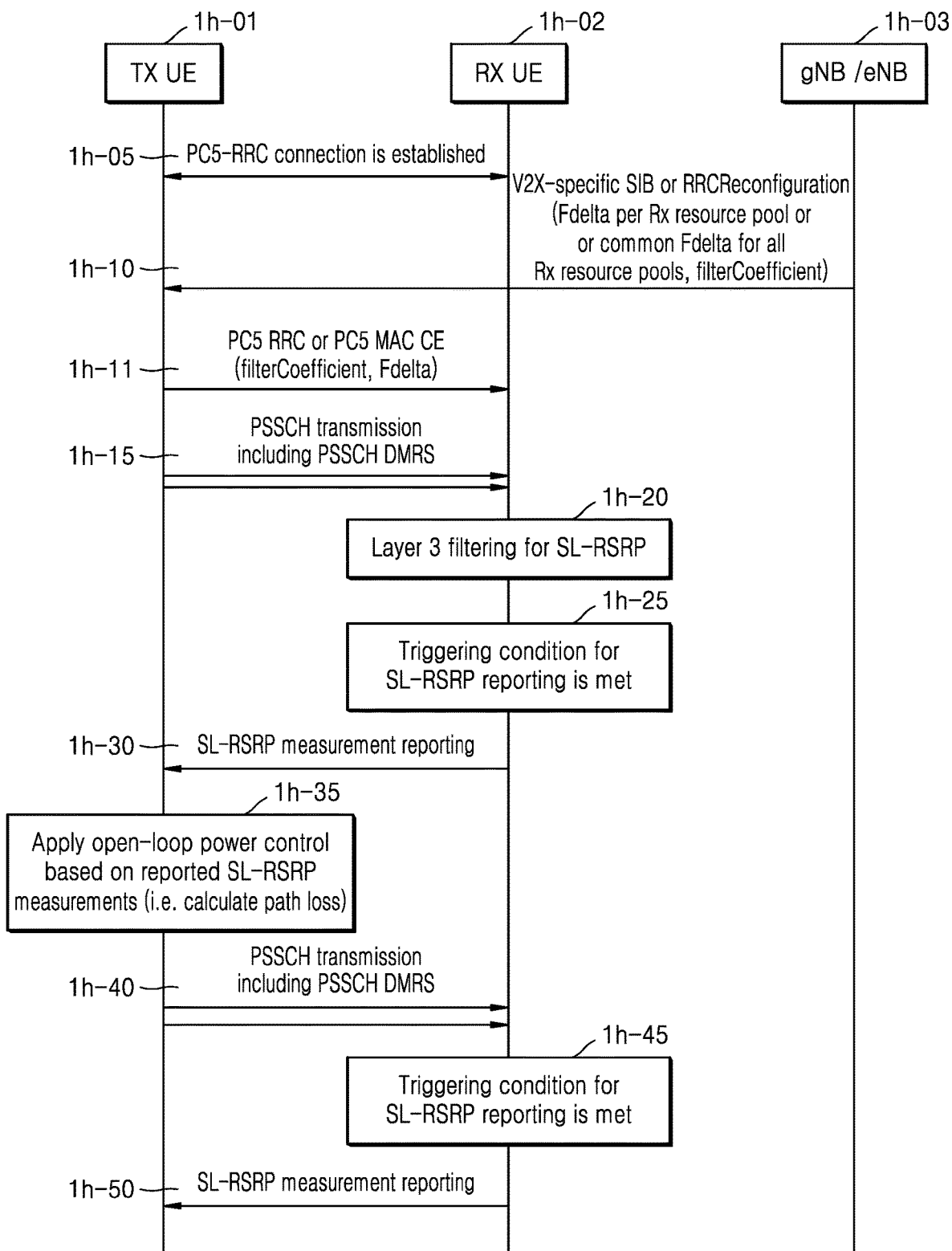
FIG. 1H is a diagram for describing a method by which a reception UE transmits L3 filtered SL-RSRP to a transmission UE, during sidelink unicast communication, according to an embodiment of the disclosure.

FIG. 1H is a diagram for describing a method by which an RX UE transmits Layer 3 filtered SL-RSRP to a TX UE, during SL unicast communication, according to an embodiment of the disclosure.

Referring to FIG. 1H, two UEs 1h-01 and 1h-02 may establish a PC5-RRC connection by performing a PC5-RRC connection procedure for SL unicast communication (operation 1h-05). Here, the TX UE 1h-01 may transmit, to the RX UE 1h-02, a PC5-RRC message containing an indicator to report an SL-RSRP measurement value. The PC5-RRC message may denote a UE capability request message, a UE capability information message, or an AS configuration information message. Alternatively, the RX UE 1h-02 may transmit, to the TX UE 1h-01, a PC5-RRC message containing an indicator that the SL-RSRP measurement value is reportable. The PC5-RRC message may denote a UE capability request message, a UE capability information message, or an AS configuration information message.

In operation 1h-10, the TX UE 1h-01 in an RRC idle mode (RRC_IDLE) or RRC inactive mode (RRC_INACTIVE) may obtain, from a gNB/eNB 1h-03, system information containing V2X SL configuration information. The system information may include measurement configuration information for Layer 3 filtered SL-RSRP. The measurement configuration information may include at least one of the followings.
  One or a plurality of FilterCoefficient values for SL unicast communication. The value may be set differently from a value used between a UE and a base station.
  A timer value for periodically reporting an SL-RSRP measurement value.
  A measurement period value indicating a period for performing Layer 3 filtering.
  A certain value (Fdelta) indicating a difference between a current SL-RSRP measurement value and an SL-RSRP measurement value most recently transmitted when transmitting an SL-RSRP measurement value. A unit of the value may be dB.
  A specific threshold value range of a Layer 3 filtered SL-RSRP measurement value.

The measurement configuration information may be configured for each reception resource pool, configured regardless of a reception resource pool, configured for each SL QoS profile, configured for each QoS flow, or configured for each destination.

In operation 1h-10, the TX UE 1g-01 in an RRC connected mode (RRC_CONNECTED) may obtain, from the gNB/eNB 1h-03, a dedicated message (for example, RRCReconfiguration) containing the V2X SL configuration information. The message may include measurement configuration information for Layer 3 filtered SL-RSRP. The measurement configuration information may include at least one of the followings.
  One or a plurality of FilterCoefficient values for SL unicast communication. The value may be set differently from a value used between a UE and a base station.
  A timer value for periodically reporting an SL-RSRP measurement value.
  A measurement period value indicating a period for performing Layer 3 filtering.

A certain value (Fdelta) indicating a difference between a current SL-RSRP measurement value and an SL-RSRP measurement value most recently transmitted when transmitting an SL-RSRP measurement value. A unit of the value may be dB.

A specific threshold value range of a Layer 3 filtered SL-RSRP measurement value.

The measurement configuration information may be configured for each reception resource pool, configured regardless of a reception resource pool, configured for each SL QoS profile, configured for each QoS flow, or configured for each destination.

In operation 1h-11, the TX UE 1h-01 may transmit, to the RX UE 1h-02, a PC5 RRC message or PC5 MAC CE including a configuration value related to SL-RSRP measurement. The configuration value related to the SL-RSRP measurement value may denote at least one of those described in operation 1h-10.

In operation 1h-15, the TX UE 1h-01 may transmit a PSSCH to the RX UE 1h-02. The RX UE 1h-02 may operate a timer upon receiving a first PSSCH from the TX UE 1h-01. The timer may denote a timer newly introduced to report an SL-RSRP measurement value. The RX UE 1h-02 may operate the timer by applying a timer value set from the TX UE 1h-01. Alternatively, the RX UE 1h-02 may operate the timer by applying a timer value pre-set internally. Alternatively, the RX UE 1h-02 may operate the timer when a specific PC5-RRC message or PC5 MAC CE is received from the TX UE 1h-01, in operation 1h-05 or 1h-11. In the present embodiment, the timer may be referred to as T3xx for convenience of descriptions.

In operation 1h-20, the RX UE 1h-02 may perform Layer 3 filtering to derive the SL-RSRP measurement value. The Layer 3 filtering may be performed by applying Equation 2 below.

$$F_n = (1-a)*F_{n-1} + a*M_n \qquad \text{Equation 2}$$

$M_n$ is the latest received measurement result from the physical layer;

$F_n$ is the updated filtered measurement result, that is used for evaluation of reporting criteria or measurement reporting;

$F_{n-1}$ is the old filtered measurement result, where $F_0$ is set to $M_1$ when the first measurement result from the physical layer is received; and for NR, $a=\frac{1}{2}^{(ki/4)}$, where $k_i$ is the SL filterCoefficient for the corresponding measurement In operation 1h-20, the RX UE 1h-02 may perform the Layer 3 filtering when the TX UE 1h-01 transmits the PSSCH. When the measurement period value indicating the period of performing the Layer 3 filtering is received from the gNB/eNB 1h-03, the RX UE 1h-02 may derive the SL-RSRP measurement value by performing the Layer 3 filtering for each period. When the measurement period value indicating the period of performing the Layer 3 filtering is not received from the gNB/eNB 1h-03, the RX UE 1h-02 may derive the SL-RSRP measurement value by performing the Layer 3 filtering for each pre-determined period. When the PSSCH is not received from the TX UE 1h-01 during the period, the RX UE 1h-02 may replace a current SL-RSRP measurement value with a previously derived SL-RSRP measurement value or initialize a value of Fn to 0.

In operation 1h-25, the RX UE 1h-02 may determine whether to report the Layer 3 filtered SL-RSRP measurement value to the TX UE 1h-01 as a certain condition is met. The certain condition may denote one of the followings.

When the operated T3xx expires.

When the Layer 3 filtered SL-RSRP measurement value is equal to or greater than a specific value.

When the Layer 3 filtered SL-RSRP measurement value is less than or equal to a specific value.

When the Layer 3 filtered SL-RSRP measurement value exists for a specific period of time.

When the Layer 3 filtered SL-RSRP measurement value is included or not included in a specific threshold value range.

In operation 1h-30, the RX UE 1h-02 may transmit, to the TX UE 1h-01, the Layer 3 filtered SL-RSRP measurement value. The Layer 3 filtered SL-RSRP measurement value may be transmitted by being included in a PC5 MAC CE or PC5 RRC message. When the Layer 3 filtered SL-RSRP measurement value is transmitted, the RX UE 1h-02 may restart the operating T3xx timer.

In operation 1h-35, the TX UE 1h-01 may apply open-loop power control based on the received Layer 3 filtered SL-RSRP measurement value. The open-loop power control may denote adjusting TX power when transmitting a next PSSCH by estimating or calculating a path loss, based on the received Layer 3 filtered SL-RSRP measurement value.

In operation 1h-40, the TX UE 1h-01 may transmit, to the RX UE 1h-02, the PSSCH based on newly applied TX power.

In operation 1h-45, the RX UE 1h-02 may determine whether to report the Layer 3 filtered SL-RSRP measurement value to the TX UE 1h-01 as a certain condition is met. The certain condition may denote one of the followings.

When a difference between the previously transmitted most recent SL-RSRP measurement value and the current SL-RSRP measurement value is equal to or greater than specific dB. The specific dB may denote a certain value indicating a difference of the SL-RSRP measurement value received from the TX UE 1h-01 in operation 1h-11, or a value pre-set in the UE (RX UE 1h-02).

In operation 1h-50, the RX UE 1h-02 may transmit, to the TX UE 1h-01, the Layer 3 filtered SL-RSRP measurement value. The Layer 3 filtered SL-RSRP measurement value may be transmitted by being included in a PC5 MAC CE or PC5 RRC message.

Figure 1I:
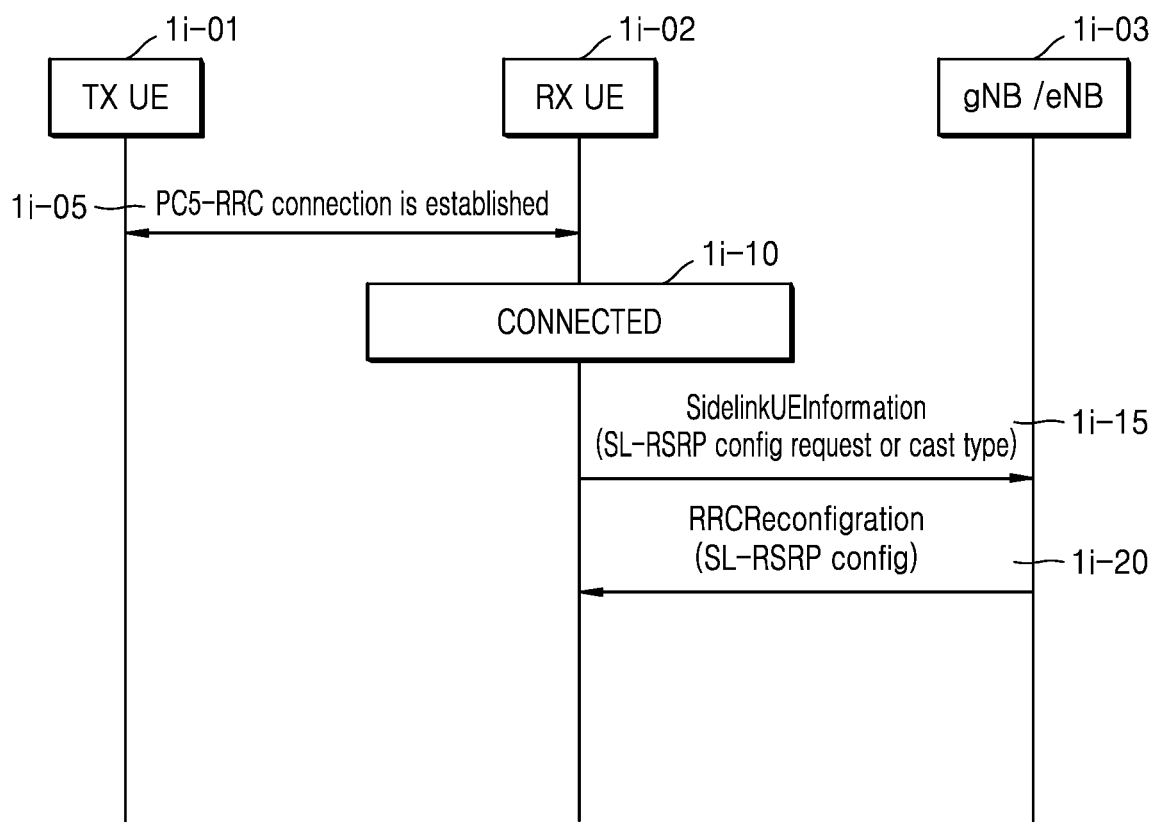
FIG. 1I is a diagram for describing a method by which a reception UE in a radio resource control (RRC) connected mode (RRC_CONNECTED) receives an SL-RSRP measurement configuration from a next-generation node B (gNB)/evolved node B (eNB), during sidelink unicast communication, according to an embodiment of the disclosure.

FIG. 1I is a diagram for describing a method by which an RX UE in an RRC connected mode (RRC_CONNECTED) receives an SL-RSRP measurement configuration from a gNB/eNB, during SL unicast communication, according to an embodiment of the disclosure.

Referring to FIG. 1I, an RX UE 1i-02 may establish a PC5-RRC connection with a TX UE 1i-01 to perform SL unicast communication, in operation 1i-05.

In operation 1i-10, the RX UE 1i-02 may establish an RRC connection with a gNB/eNB 1i-03 and thus be in an RRC connected mode (RRC_CONNECTED).

In operation 1i-15, the RX UE 1i-02 may transmit a SidelinkUEInformation message to the gNB/eNB 1i-03. The message may include content requesting SL-RSRP measurement configuration information or indicating a unicast.

In operation 1i-20, the RX UE 1i-02 may receive an RRCReconfiguration message from the gNB/eNB 1i-03. The message may include the SL-RSRP measurement configuration information.

Figure 1J:
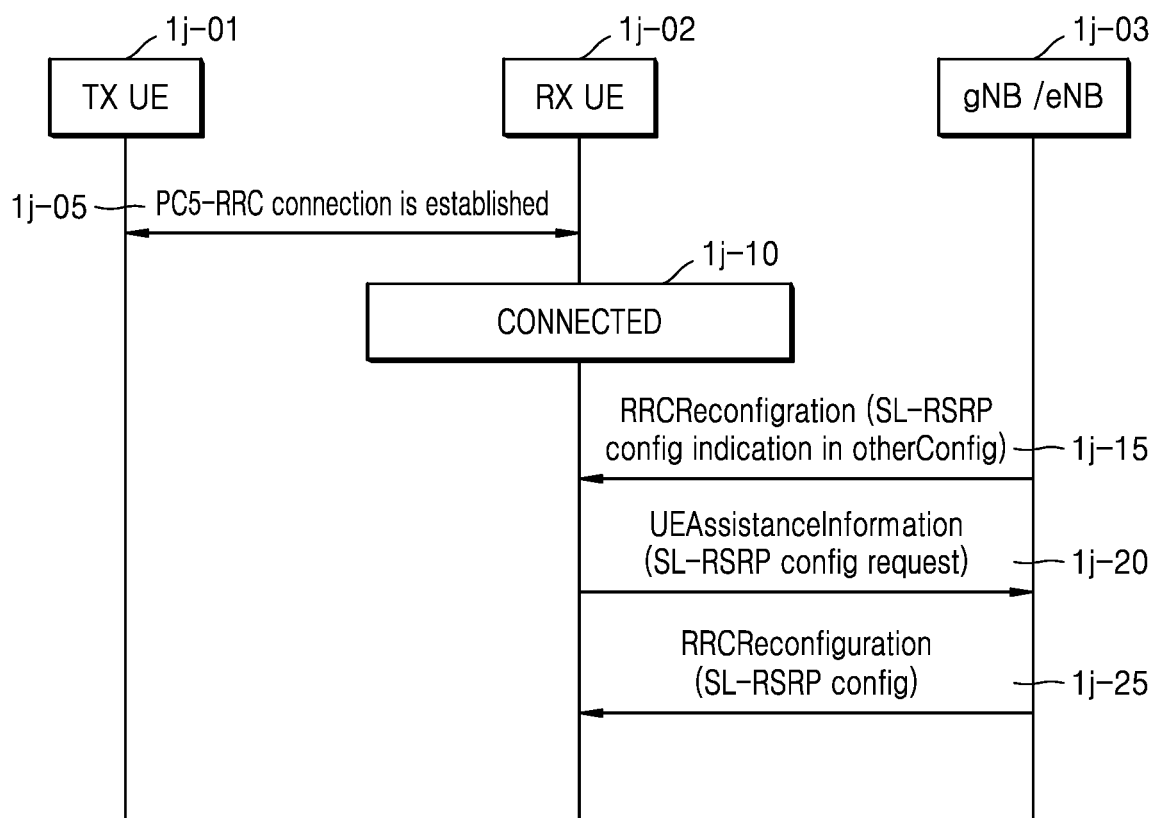
FIG. 1J is a diagram for describing a method by which a reception UE in an RRC connected mode (RRC_CONNECTED) receives an SL-RSRP measurement configuration from a gNB/eNB, during sidelink unicast communication, according to an embodiment of the disclosure.

FIG. 1J is a diagram for describing a method by which an RX UE in an RRC connected mode (RRC_CONNECTED) receives an SL-RSRP measurement configuration from a gNB/eNB, during SL unicast communication, according to an embodiment of the disclosure.

Referring to FIG. 1J, an RX UE 1*j*-02 may establish a PC5-RRC connection with a TX UE 1*j*-01 to perform SL unicast communication, in operation 1*j*-05.

In operation 1*j*-10, the RX UE 1*j*-02 may establish an RRC connection with a gNB/eNB 1*j*-03 and thus be in an RRC connected mode (RRC_CONNECTED).

In operation 1*j*-20, the RX UE 1*j*-02 may receive an RRCReconfiguration message from the gNB/eNB 1*j*-03. The message may include the SL-RSRP measurement configuration indicator. The indicator may be included in otherConfig.

In operation 1*j*-20, the RX UE 1*j*-02 may transmit an UEAssistanceInformation message to the gNB/eNB 1*j*-03. The message may include an indicator requesting SL-RSRP measurement configuration information.

In operation 1*j*-25, the RX UE 1*j*-02 may receive an RRCReconfiguration message from the gNB/eNB 1*j*-03. The message may include the SL-RSRP measurement configuration information.

According to an embodiment of the disclosure, an operation method of a first terminal in a wireless communication system includes: receiving, from a second terminal, a PC5 radio resource control (RRC) reconfiguration message including configuration information for measurement of sidelink reference signal received power (SL-RSRP); measuring the SL-RSRP, based on the configuration information for measuring the SL-RSRP; and when a reporting type regarding the measurement of the SL-RSRP is periodic reporting and a measurement value of a Layer 3 filtered SL-RSRP is present, transmitting the measurement value of the Layer 3 filtered SL-RSRP to the second terminal.

According to an embodiment, the operation method may further include performing Layer 3 filtering on a measurement value of the SL-RSRP, based on a filtering coefficient related to the measurement of the SL-RSRP, wherein the filtering coefficient is included in the configuration information for the measurement of the SL-RSRP.

According to an embodiment, the configuration for the measurement of the SL-RSRP may be configured for each PC5 RRC connection between the first terminal performing unicast communication with the second terminal, and the second terminal.

According to an embodiment, the configuration information for the measurement of the SL-RSRP may include information about a value of a timer related to the periodic reporting regarding the measurement of the SL-RSRP, and the operation method may further include starting the timer for the periodic reporting regarding the measurement of the SL-RSRP, based on the information about the value of the timer.

According to an embodiment, the operation method may further include, when the timer for the periodic reporting regarding the measurement of the SL-RSRP expires, transmitting the measurement value of the Layer 3 filtered SL-RSRP to the second terminal.

According to an embodiment, the transmitting of the measurement value of the Layer 3 filtered SL-RSRP to the second terminal may include, regardless of whether the timer for the periodic reporting regarding the measurement of the SL-RSRP has expired, transmitting the measurement value of the Layer 3 filtered SL-RSRP to the second terminal.

According to an embodiment the transmitting of the measurement value of the Layer 3 filtered SL-RSRP to the second terminal may include, when the measurement value of the Layer 3 filtered SL-RSRP is greater than a threshold value, transmitting the measurement value of the Layer 3 filtered SL-RSRP to the second terminal.

According to an embodiment, the transmitting of the measurement value of the Layer 3 filtered SL-RSRP to the second terminal may include, when the measurement value of the Layer 3 filtered SL-RSRP is less than a threshold value, transmitting the measurement value of the Layer 3 filtered SL-RSRP to the second terminal.

According to an embodiment of the disclosure, an operation method of a second terminal in a wireless communication system includes: receiving, from a base station, a radio resource control (RRC) reconfiguration message including configuration information for measurement of sidelink reference signal received power (SL-RSRP); transmitting, to a first terminal, a PC5 RRC reconfiguration message including the configuration information for the measurement of the SL-RSRP, based on the RRC reconfiguration message received from the base station, wherein the SL-RSRP is measured by the first terminal based on the configuration information for the measurement of the SL-RSRP; and receiving a measurement value of a Layer 3 filtered SL-RSRP from the first terminal, wherein the measurement value of the Layer 3 filtered SL-RSRP is received from the first terminal when a reporting type regarding the measurement of the SL-RSRP is periodic reporting and the measurement value of the Layer 3 filtered SL-RSRP is present.

According to an embodiment, the configuration for the measurement of the SL-RSRP may be configured for each PC5 RRC connection between the first terminal performing unicast communication with the second terminal, and the second terminal.

According to an embodiment, the configuration information for the measurement of the SL-RSRP may include information about a value of a timer related to the periodic reporting regarding the measurement of the SL-RSRP, and the timer for the periodic reporting regarding the measurement of the SL-RSRP may start based on the information about the value of the timer.

According to an embodiment, when the timer for the periodic reporting regarding the measurement of the SL-RSRP expires, the measurement value of the Layer 3 filtered SL-RSRP may be received from the first terminal.

According to an embodiment, regardless of whether the timer for the periodic reporting regarding the measurement of the SL-RSRP has expired, the measurement value of the Layer 3 filtered SL-RSRP may be received from the first terminal.

According to an embodiment of the disclosure, a first terminal in a wireless communication system includes: a transceiver; and at least one processor configured to: receive, from a second terminal through the transceiver, a PC5 radio resource control (RRC) reconfiguration message including configuration information for measurement of sidelink reference signal received power (SL-RSRP); measure the SL-RSRP, based on the configuration information for measuring the SL-RSRP; and when a reporting type regarding the measurement of the SL-RSRP is periodic reporting and a measurement value of a Layer 3 filtered SL-RSRP is present, transmit the measurement value of the Layer 3 filtered SL-RSRP to the second terminal through the transceiver.

According to an embodiment of the disclosure, a second terminal in a wireless communication system includes: a transceiver; and at least one processor configured to: receive, from a base station through the transceiver, a radio resource control (RRC) reconfiguration message including configuration information for measurement of sidelink reference signal received power (SL-RSRP); transmit, to a first terminal through the transceiver, a PC5 RRC reconfiguration message including the configuration information for the measurement of the SL-RSRP, based on the RRC reconfiguration message received from the base station, wherein the SL-RSRP is measured by the first terminal based on the configuration information for the measurement of the SL-RSRP; and receive, from the first terminal through the transceiver, a measurement value of a Layer 3 filtered SL-RSRP, wherein the measurement value of the Layer 3 filtered SL-RSRP is received from the first terminal when a reporting type regarding the measurement of the SL-RSRP is periodic reporting and the measurement value of the Layer 3 filtered SL-RSRP is present.

Figure 1K:
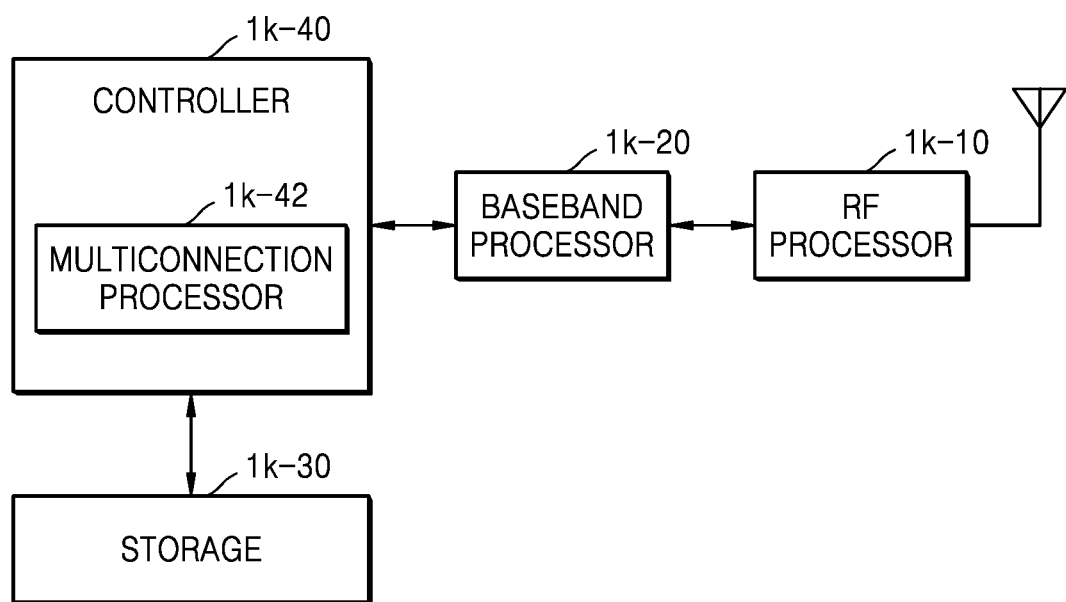
FIG. 1K illustrates a structure of a terminal, according to an embodiment of the disclosure.

FIG. 1K illustrates a structure of a terminal, according to an embodiment of the disclosure. The terminal according to an embodiment of the disclosure may include a radio frequency (RF) processor $1k$-10, a baseband processor $1k$-20, a storage $1k$-30, and a controller $1k$-40.

Referring to FIG. 1K, the RF processor $1k$-10 according to an embodiment of the disclosure may perform functions for transmitting and receiving a signal via a radio channel, such as a band conversion, amplification, and the like of the signal. That is, the RF processor $1k$-10 may up-convert a baseband signal provided from the baseband processor $1k$-20, to an RF band signal and transmit the RF band signal through an antenna, and down-convert an RF band signal received through an antenna, to a baseband signal. For example, the RF processor $1k$-10 may include a transmit filter, a receive filter, an amplifier, a mixer, an oscillator, a digital-to-analog converter (DAC), and an analog-to-digital converter (ADC). Although only one antenna is illustrated in FIG. 1K, the terminal may include a plurality of antennas.

The RF processor $1k$-10 may include a plurality of RF chains. In addition, the RF processor $1k$-10 may perform beamforming. For beamforming, the RF processor $1k$-10 may adjust phases and amplitudes of signals transmitted or received through multiple antennas or antenna elements. Also, the RF processor $1k$-10 may perform multiple input multiple output (MIMO) and may receive several layers during the MIMO operation. The RF processor $1k$-10 may perform received beam sweeping by appropriately configuring the plurality of antennas or antenna elements, or adjust a direction and beam width of a received beam to coordinate with a transmit beam, under control by the controller $1k$-40.

The baseband processor $1k$-20 may perform a conversion function between a baseband signal and a bitstream, according to physical layer specifications of a system. For example, for data transmission, the baseband processor $1k$-20 may generate complex symbols by encoding and modulating a transmit bitstream. Also, for data reception, the baseband processor $1k$-20 may reconstruct a received bitstream by demodulating and decoding a baseband signal provided from the RF processor $1k$-10. For example, according to an orthogonal frequency division multiplexing (OFDM) scheme, for data transmission, the baseband processor $1k$-20 may generate complex symbols by encoding and modulating a transmit bitstream, map the complex symbols to subcarriers, and then configure OFDM symbols via inverse fast Fourier transform (IFFT) operation and cyclic prefix (CP) insertion. Also, for data reception, the baseband processor $1k$-20 may split a baseband signal provided from the RF processor $1k$-10, into OFDM symbol units, reconstruct signals mapped to subcarriers via a fast Fourier transform (FFT) operation, and then reconstruct a received bitstream via demodulation and decoding.

The baseband processor $1k$-20 and the RF processor $1k$-10 may transmit and receive signals as described above. In this regard, each of the baseband processor $1k$-20 and the RF processor $1k$-10 may also be called a transmitter, a receiver, a transceiver, or a communicator. In addition, at least one of the baseband processor $1k$-20 or the RF processor $1k$-10 may include a plurality of communication modules to support a plurality of different radio access technologies. Also, at least one of the baseband processor $1k$-20 or the RF processor $1k$-10 may include different communication modules to process signals of different frequency bands. For example, the different radio access technologies may include an LTE network, NR network, etc. The different frequency bands may include a super high frequency (SHF) (e.g., 2.2 GHz or 2 GHz) band and a mmWave (e.g., 60 GHz) band.

The storage $1k$-30 may store data for operations of the terminal, e.g., basic programs, application programs, and configuration information. The storage $1k$-30 may provide the stored data upon a request by the controller $1k$-40. According to an embodiment, the storage $1k$-30 may store a method by which a reception terminal performs L3 filtering and a program for the reception terminal to transmit a measurement result of performing the L3 filtering to a transmission terminal, when unicast vehicle communication according to embodiments of the disclosure described above is performed.

The controller $1k$-40 may control overall operations of the terminal. For example, when the unicast vehicle communication according to embodiments of the disclosure is performed, components of the terminal may be controlled such that the method by which the reception terminal performs the L3 filtering is performed and the reception terminal transmits the measurement result of performing the L3 filtering to the transmission terminal. For example, the controller $1k$-40 may transmit and receive signals through the baseband processor $1k$-20 and the RF processor $1k$-10. The controller $1k$-40 may record and read data on and from the storage $1k$-30. In this regard, the controller $1k$-40 may include at least one processor. For example, the controller $1k$-40 may include a communication processor (CP) performing control for communication, and an application processor (AP) controlling an upper layer, such as an application program. According to an embodiment, the controller $1k$-40 may include a multiconnection processor $1k$-42.

Figure 1L:
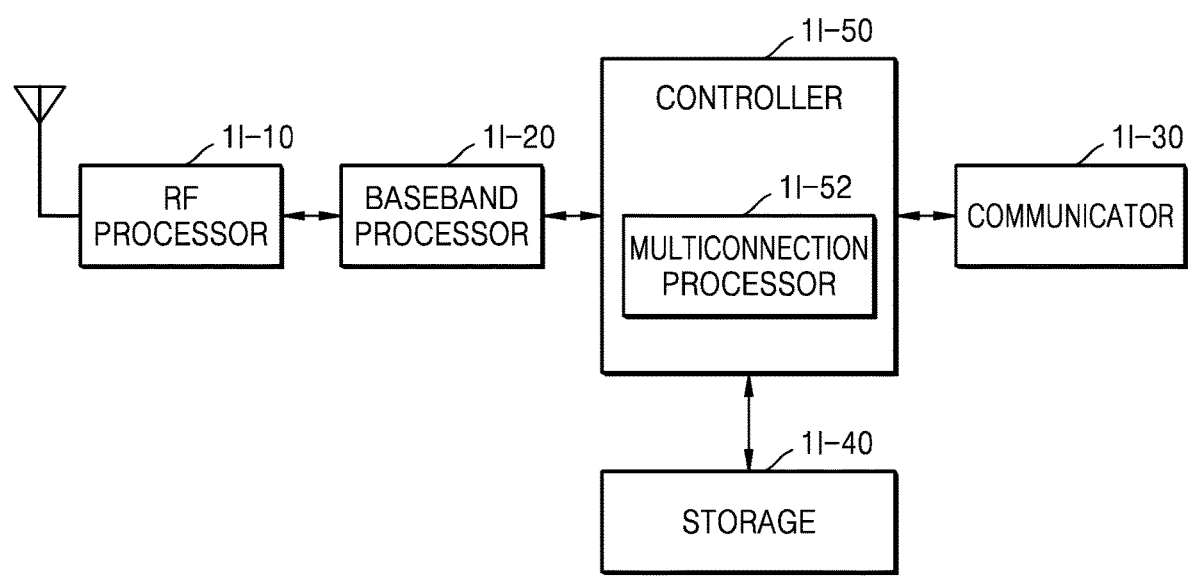
FIG. 1L illustrates a structure of a base station, according to an embodiment of the disclosure.

FIG. 1L illustrates a structure of a base station, according to an embodiment of the disclosure.

The base station according to an embodiment of the disclosure may include at least one transmission reception point (TRP).

The base station according to an embodiment of the disclosure may include an RF processor $1l$-10, a baseband processor $1l$-20, a backhaul communicator $1l$-30, a storage $1l$-40, and a controller $1l$-50.

Referring to FIG. 1L, the RF processor $1l$-10 may perform functions for transmitting and receiving signals through radio channels, e.g., signal band conversion and amplification. That is, the RF processor $1l$-10 may up-convert a baseband signal provided from the baseband processor $1l$-20, to an RF band signal and transmit the RF band signal through an antenna, and down-convert an RF band signal received through an antenna, to a baseband signal. For example, the RF processor $1l$-10 may include a transmit filter, a receive filter, an amplifier, a mixer, an oscillator, a DAC, and an ADC. Although only one antenna is illustrated in FIG. 1L, the base station may include a plurality of antennas.

The RF processor $1l$-10 may include a plurality of RF chains. In addition, the RF processor $1l$-10 may perform beamforming. For the beamforming, the RF processor $1l$-10 may adjust phases and amplitudes of signals transmitted or received through the plurality of antennas or antenna elements. The RF processor 1*l*-10 may perform a DL MIMO operation by transmitting at least one layer.

The baseband processor 1*l*-20 may convert between a baseband signal and a bitstream based on physical layer specifications of a first radio access technology. For example, for data transmission, the baseband processor 1*l*-20 may generate complex symbols by encoding and modulating a transmit bitstream. Also, for data reception, the baseband processor 1*l*-20 may reconstruct a received bitstream by demodulating and decoding a baseband signal provided from the RF processor 1*l*-10. For example, according to an OFDM scheme, for data transmission, the baseband processor 1*l*-20 may generate complex symbols by encoding and modulating a transmit bitstream, map the complex symbols to subcarriers, and then configure OFDM symbols via IFFT operation and CP insertion. Also, for data reception, the baseband processor 1*l*-20 may split a baseband signal provided from the RF processor 1*l*-10, into OFDM symbol units, reconstruct signals mapped to subcarriers via FFT operation, and then reconstruct a received bitstream via demodulation and decoding. The baseband processor 1*l*-20 and the RF processor 1*l*-10 may transmit and receive signals as described above.

In this regard, each of the baseband processor 1*l*-20 and the RF processor 1*l*-10 may also be called a transmitter, a receiver, a transceiver, or a wireless communicator.

The communicator (or backhaul communicator) 1*l*-30 may provide an interface for communicating with other nodes in a network. In other words, the communicator 1*l*-30 may convert a bitstream transmitted from a main base station to another node, for example, an auxiliary base station or a core network, into a physical signal, and convert a physical signal received from another node into a bitstream.

The storage 1*l*-40 may store data for operations of a main base station, e.g., basic programs, application programs, and configuration information. In particular, the storage 1*l*-40 may store information about bearers allocated for a connected terminal, a measurement report transmitted from the connected terminal, etc. Also, the storage 1*l*-40 may store criteria information used to determine whether to provide or release multiconnection to or from the terminal. Also, the storage 1*l*-40 may provide the stored data upon a request by the controller 1*l*-50. According to an embodiment, the storage 1*l*-40 may store a method by which a reception terminal performs L3 filtering and a program for the reception terminal to transmit a measurement result of performing the L3 filtering to a transmission terminal, when unicast vehicle communication according to embodiments of the disclosure described above is performed.

The controller 1*l*-50 may control overall operations of the main base station. For example, when the unicast vehicle communication according to embodiments of the disclosure is performed, components of the terminal may be controlled such that the method by which the reception terminal performs the L3 filtering is performed and the reception terminal transmits the measurement result of performing the L3 filtering to the transmission terminal. For example, the controller 1*l*-50 may transmit and receive signals through the baseband processor 1*l*-20 and the RF processor 1*l*-10 or through the communicator 1*l*-30. Also, the controller 1*l*-50 may record and read data on and from the storage 1*l*-40. In this regard, the controller 1*l*-50 may include at least one processor. According to an embodiment, the controller 1*l*-50 may include a multiconnection processor 1*l*-52.

The methods according to the embodiments of the disclosure described in the claims or the detailed description of the disclosure may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments of the disclosure described in the claims or the detailed description of the disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory including a combination of some or all of the above-mentioned memories. In addition, there may be a plurality of memories.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

In the disclosure, the term "computer program product" or "computer-readable medium" is used to entirely refer to a medium such as a memory, a hard disk installed in a hard disk drive, or a signal. The "computer program product" or the "computer-readable medium" provides a method by which a reception terminal performs L3 filtering and a method by which a reception terminal transmits a measurement result of performing the L3 filtering to a transmission terminal, when unicast vehicle communication according to the disclosure is performed.

In specific embodiments of the disclosure described above, elements included in the disclosure are expressed in a singular or plural form according to the specific embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, specific embodiments have been described in the detailed description of the disclosure, but various modifications may be possible without departing from the scope of the disclosure. Therefore, the scope of the disclosure should not be limited to the embodiments described above, but should be determined not only by the scope of the following claims, but also by the equivalents of the claims.

The invention claimed is:

1. An operation method of a first terminal in a wireless communication system, the operation method comprising:
   receiving, from a second terminal, a radio resource control (RRC) reconfiguration message including configuration information associated with measurement of sidelink reference signal received power (SL-RSRP), wherein the configuration information associated with the measurement of the SL-RSRP includes information for a timer related to a periodic reporting regarding the measurement of the SL-RSRP;

performing measurement of a Layer 3 filtered SL-RSRP, based on the configuration information associated with the measurement of the SL-RSRP;

starting the timer related to the periodic reporting, based on the information for the timer; and transmitting, to the second terminal, the measurement result of the Layer 3filtered SL-RSRP, based on an expiry of the timer or existence of the measurement result of the Layer 3 filtered SL-RSRP.

2. The operation method of claim 1, wherein performing measurement of the Layer 3 filtered SL-RSRP is associated with a filtering coefficient, a latest received measurement result of SL-RSRP, and a previous Layer 3 filtered measurement result of SL-RSRP, and wherein the filtering coefficient is related to the measurement of the SL-RSRP and is included in the configuration information associated with the measurement of the SL-RSRP.

3. The operation method of claim 1, wherein the configuration information associated with the measurement of the SL-RSRP is configured for PC5 RRC connection between the first terminal and the second terminal, wherein the first terminal communicates with the second terminal for unicast.

4. The operation method of claim 1, wherein the transmitting of the measurement result of the Layer 3 filtered SL-RSRP to the second terminal comprises, regardless of whether the timer related to the periodic reporting has expired, transmitting the measurement result of the Layer 3 filtered SL-RSRP to the second terminal.

5. The operation method of claim 1, wherein the transmitting of the measurement result of the Layer 3 filtered SL-RSRP to the second terminal comprises, when the measurement result of the Layer 3 filtered SL-RSRP is greater than a threshold value, transmitting the measurement result of the Layer 3 filtered SL-RSRP to the second terminal.

6. The operation method of claim 1, wherein the transmitting of the measurement result of the Layer 3 filtered SL-RSRP to the second terminal comprises, when the measurement result of the Layer 3 filtered SL-RSRP is less than a threshold value, transmitting the measurement result of the Layer 3 filtered SL-RSRP to the second terminal.

7. An operation method of a second terminal in a wireless communication system, the operation method comprising:

receiving, from a base station, a radio resource control (RRC) reconfiguration message including configuration information associated with measurement of sidelink reference signal received power (SL-RSRP), wherein the configuration information associated with the measurement of the SL-RSRP includes information for a timer related to a periodic reporting regarding the measurement of the SL-RSRP;

transmitting, to a first terminal, a RRC reconfiguration message including the configuration information associated with the measurement of the SL-RSRP, based on the RRC reconfiguration message received from the base station, wherein the SL-RSRP is measured by the first terminal based on the configuration information associated with the measurement of the SL-RSRP; and receiving a measurement result of a Layer 3 filtered SL-RSRP from the first terminal, wherein the measurement result of the Layer 3 filtered SL-RSRP is received from the first terminal in case that the measurement of the Layer 3 filtered SL-RSRP is performed by the first terminal.

8. The operation method of claim 7, wherein the configuration information associated with the measurement of the SL-RSRP is configured for PC5 RRC connection between the first terminal and the second terminal, wherein the first terminal communicates with the second terminal for unicast.

9. The operation method of claim 7, wherein the timer related to the periodic reporting starts based on the information for the timer.

10. The operation method of claim 9, wherein, regardless of whether the timer related to the periodic reporting has expired, the measurement result of the Layer 3 filtered SL-RSRP is received from the first terminal.

11. A first terminal in a wireless communication system, the first terminal comprising:

a transceiver; and at least one processor configured to:

receive, from a second terminal through the transceiver, a radio resource control (RRC) reconfiguration message including configuration information associated with measurement of sidelink reference signal received power (SL-RSRP), wherein the configuration information associated with the measurement of the SL-RSRP includes information for a timer related to a periodic reporting regarding the measurement of the SL-RSRP;

perform measurement of a Layer 3 filtered SL-RSRP, based on the configuration information associated with the measurement of the SL-RSRP;

start the timer related to the periodic reporting, based on the information for the timer; and transmit, to the second terminal through the transceiver, the measurement result of the Layer 3 filtered SL-RSRP based on an expiry of the timer or existence of the measurement result of the Layer 3 filtered SL-RSRP.

12. A second terminal in a wireless communication system, the second terminal comprising:

a transceiver; and at least one processor configured to:

receive, from a base station through the transceiver, a radio resource control (RRC) reconfiguration message including configuration information associated with measurement of sidelink reference signal received power (SL-RSRP), wherein the configuration information associated with the measurement of the SL-RSRP includes information for a timer related to a periodic reporting regarding the measurement of the SL-RSRP;

transmit, to a first terminal through the transceiver, a RRC reconfiguration message including the configuration information associated with the measurement of the SL-RSRP, based on the RRC reconfiguration message received from the base station, wherein the SL-RSRP is measured by the first terminal based on the configuration information associated with the measurement of the SL-RSRP; and receive, from the first terminal through the transceiver, a measurement result of a Layer 3 filtered SL-RSRP, wherein the measurement result of the Layer 3 filtered SL-RSRP is received from the first terminal based on an expiry of the timer related to the periodic reporting or existence of the measurement result of the Layer 3 filtered SL-RSRP. in case that the measurement of the Layer 3 filtered SL-RSRP is performed by the first terminal.

\* \* \* \* \*